(12) United States Patent
Mecklenburg et al.

(10) Patent No.: US 8,393,847 B1
(45) Date of Patent: Mar. 12, 2013

(54) TANK HANDLING APPARATUS AND METHOD

(75) Inventors: Robert Joseph Mecklenburg, Buena Park, CA (US); David James Delany, Huntington Beach, CA (US); Michael Francis Basch, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 334 days.

(21) Appl. No.: 12/821,380

(22) Filed: Jun. 23, 2010

(51) Int. Cl.
*B60P 1/54* (2006.01)
*B60P 3/00* (2006.01)

(52) U.S. Cl. ......... 414/555; 108/142; 211/78; 280/79.3; 280/79.5; 403/325; 414/539; 414/550; 414/684; 414/723; 414/911

(58) Field of Classification Search ............... 414/22.66, 414/23, 223.01, 331.05, 448, 539, 549, 550, 414/555, 684, 723, 745.1, 911; 211/70, 77, 211/78, 85.18; 104/47
See application file for complete search history.

(56) References Cited

U.S. PATENT DOCUMENTS

| | | | | |
|---|---|---|---|---|
| 95,446 A * | 10/1869 | Emmart et al. | ................. | 104/47 |
| 992,917 A * | 5/1911 | Simpson | ......................... | 104/44 |
| 2,489,864 A * | 11/1949 | Cravener | ................... | 294/82.35 |
| 2,970,701 A * | 2/1961 | Fetter | .............................. | 211/78 |
| 3,306,467 A * | 2/1967 | Weempe | ....................... | 414/541 |
| 3,602,469 A * | 8/1971 | Hammonds | ..................... | 410/64 |
| 3,664,515 A * | 5/1972 | Orendorff et al. | ............ | 212/280 |
| 3,913,754 A * | 10/1975 | Swartz et al. | .............. | 414/22.66 |
| 3,985,189 A * | 10/1976 | Jahnke et al. | ................... | 175/52 |
| 4,018,468 A * | 4/1977 | Lundquist | .................. | 294/119.2 |
| 4,345,872 A * | 8/1982 | Arnold | .......................... | 414/705 |
| 4,417,844 A * | 11/1983 | de Pingon | ..................... | 414/723 |
| 4,755,099 A * | 7/1988 | Belveal | ........................ | 414/607 |
| 4,892,160 A * | 1/1990 | Schivley et al. | ................ | 175/85 |
| 4,899,968 A * | 2/1990 | Eaglin et al. | ................. | 248/131 |
| 5,024,175 A * | 6/1991 | Epstein | ...................... | 112/217.2 |
| 5,110,254 A * | 5/1992 | Aubrey | .......................... | 414/723 |
| 5,180,179 A * | 1/1993 | Salvucci | .................. | 280/47.315 |
| 5,472,254 A * | 12/1995 | Wander | ...................... | 294/82.35 |
| 6,343,824 B1 * | 2/2002 | Foy | .............................. | 294/82.35 |
| 6,840,705 B2 * | 1/2005 | Rager | .......................... | 403/325 |
| 7,416,196 B2 * | 8/2008 | Brown | ....................... | 280/79.11 |
| 7,470,100 B2 * | 12/2008 | Hackett et al. | ................ | 414/685 |
| 7,748,545 B2 * | 7/2010 | Johnson | ........................... | 211/78 |

FOREIGN PATENT DOCUMENTS

FR 2653394 A1 * 4/1991 ................... 414/543
JP 01049237 A * 2/1989 ................... 414/550

OTHER PUBLICATIONS

Industrial Ladder, pp. 1-2, retrieved Apr. 21, 2010, www.industrial-lader.com/listSubCategories.
"Mterial Handling StrongArm: Hoist that Tank ", PrimeMover Onlien Magazine, pp. 1-3, retrieved Apr. 21, 2010 http://www.ibtinc.com/artman/publish/mh/strongarmhoist_that_tank.shtml.
BLP Ultra Lifting Devices and Forklift Attachments, pp. 1, retrieved Apr. 21, 2010 http://blog.lifting.com/lifting-devices-equipment-selection/.

* cited by examiner

*Primary Examiner* — James Keenan
(74) *Attorney, Agent, or Firm* — Yee & Associates, P.C.

(57) ABSTRACT

An apparatus and method may comprise a platform, a rotatable structure on the platform, an arm associated with the platform, and an interface associated with the arm. The structure may be configured to hold a number of tanks. The arm may be configured to move about a plurality of axes. The interface may be configured to connect to a tank in the number of tanks. The arm may be configured to move the tank about the plurality of axes when the interface is connected to the tank.

22 Claims, 14 Drawing Sheets

TANK HANDLING APPARATUS AND METHOD

BACKGROUND INFORMATION

1. Field

The present disclosure relates generally to mechanical systems and methods for transporting and handling objects, such as tanks. Still more particularly, the present disclosure relates to an apparatus and method for handling fuel tanks, such as propane tanks, or other tanks for containing compressed liquids or gases.

2. Background

The transportation and handling of large and heavy objects, such as storage tanks, may be an important part of many operations. These storage tanks may hold materials such as liquids, gases, powders, solid materials, and/or other forms of materials. These storage tanks may also be referred to herein to as "tanks". These operations may include, for example, without limitation, transportation, commercial, industrial, manufacturing, residential, military, private business, public government, and/or other suitable types of operations. For example, without limitation, these operations may include transporting fuel tanks, such as propane tanks, between various locations. The fuel tanks may be transported to and from locations, such as, for example, without limitation, storage sites, filling sites, operational sites, and/or other suitable locations.

Empty or filled tanks may be stored at storage sites. Tanks may be filled with fuel at the filling sites. Full tanks may be loaded onto vehicles or other equipment for use at operational sites. Additionally, empty tanks may be removed from such vehicles or equipment at these operational sites. Operational sites may include in-field repair sites or other sites where vehicles, equipment, and/or tanks themselves may be maintained and/or serviced.

Fuel tanks may be loaded onto a vehicle for transport between a storage site, a filling site, and/or an operational site. At the destination site, the fuel tanks may be removed from the vehicle and moved into a desired position at the site.

For example, without limitation, fuel tanks may be moved into a desired position at a filling site for tank refilling. Some fuel tanks may be stored and transported in an upright position but may be turned on their side to be refilled. Fuel tanks also may be moved into a desired position at an operational site for loading onto a vehicle and/or other equipment. Later, the fuel tanks may be moved again when they are removed from the vehicle and/or equipment when the tanks are empty.

The fuel tanks may also be removed for maintenance and servicing of the vehicle, the equipment, and/or the tanks themselves. Thus, fuel tank handling operations may include moving tanks about multiple axes at the sites to which and from which fuel tanks are transported.

Fuel tank handling operations often may be performed manually by human operators. For example, one or more human operators may grasp, lift, and move a fuel tank into a desired position. Fuel tanks may often be quite heavy, especially when a tank is full. The dynamic loading of fuel movement in tanks may also make the fuel tanks more difficult to handle. Thus, manual handling of fuel tanks may require strength and coordination of the human operators. Further, manual handling of fuel tanks may take more time than desired and be less efficient than desired.

Current methods for handling fuel tanks may limit the effectiveness and efficiency with which fuel tanks and other tanks may be handled in various operational environments and situations. As one example, without limitation, manual fuel tank handling may be limited by the strength and endurance of the human operators available for performing such tasks. As a result, additional operators may be needed. This situation may increase the cost and time needed to move the fuel tanks.

Additionally, manual handling of fuel tanks may pose a number of safety issues. Further, manual handling of fuel tanks may have undesired effects with respect to ergonomics.

Accordingly, it would be advantageous to have an apparatus and method which takes into account one or more of the issues discussed above, as well as possibly other issues.

SUMMARY

In one advantageous embodiment, an apparatus may comprise a platform, a structure on the platform, an arm associated with the platform, and an interface associated with the arm. The structure may be configured to hold a number of tanks. The arm may be configured to move about a plurality of axes. The interface may be configured to connect to a tank in the number of tanks. The arm may be configured to move the tank about the plurality of axes when the interface is connected to the tank.

In another advantageous embodiment, an apparatus may comprise a vehicle, a platform mounted on the vehicle, a rotatable structure on the platform, a tank securing structure on the rotatable structure, a locking system, an arm associated with the platform, and an interface associated with the arm. The rotatable structure may be configured to hold a number of tanks and may comprise a rotatable surface and a number of members. Each member in the number of members may comprise a ring on the rotatable surface. The ring may be configured to receive a base of a tank in the number of tanks to hold the tank on the rotatable surface. The tank securing structure may be configured to hold the number of tanks on the rotatable structure. The tank securing structure may comprise a plurality of securing rings, a rod attached by an extension to each securing ring, a tab extending from at least one of the rod and the extension associated with each securing ring, a ring support structure on the rotatable surface, and a rod support on the ring support structure. Each securing ring in the plurality of securing rings may be configured to hold a fuel tank. The rod support may be configured to support the rods and to allow vertical movement of the rods. The ring support structure may comprise a tab engagement structure. The tab engagement structure may be configured to receive the tab to prevent rotational movement of a securing ring when the tab associated with the securing ring is received in the tab engagement structure. The locking system may be configured to lock the rotatable structure in a position. The locking system may comprise a plurality of ramps on the rotatable structure, a slot in each of the plurality of ramps, and a moveable bar associated with the platform. The moveable bar may be configured to drop into the slot and hold the rotatable structure in a selected position when the rotatable structure moves to the selected position. The arm may be configured to move about a plurality of axes. The arm may comprise a plurality of segments and a number of joints. The interface may be configured to connect to a connector associated with a tank in the number of tanks. The connector may be associated with an attachment ring. The attachment ring may be configured to receive the tank. The interface may include a moveable pin. The moveable pin may be configured to engage a radial channel formed in the connector. The interface may comprise a sleeve configured to receive the connector to allow rotation of the tank connected to the arm when the moveable pin is engaged in the channel formed in the connector. The arm may be configured to move the tank about the plurality of axes when the interface is connected to the tank.

In yet another advantageous embodiment, a method of handling a tank may comprise positioning an arm relative to a tank, connecting the tank to an interface, and moving the arm such that the tank is moved into a desired position. The tank may be held by a structure on a platform. The structure may be configured to hold a number of tanks. The arm may be associated with the platform. The arm may be configured to move about a plurality of axes. The arm may have an interface configured to connect to the tank.

In another advantageous embodiment, a method of handling a tank may comprise positioning an arm relative to a tank held by a rotatable structure on a platform, positioning the tank relative to the arm, locking the rotatable structure in a selected position, connecting an interface to a connector associated with the tank, disengaging the tank from a securing structure on the rotatable structure, moving the arm such that the tank is moved into a desired position above the arm, rotating the tank with respect to the arm, and removing the tank from the arm when the tank is in the desired position above the arm. The rotatable structure may be configured to hold a number of tanks. Each of the number of tanks may be selected from one of a fuel tank and a propane gas tank. The arm may be associated with the platform. The arm may be configured to move about a plurality of axes. The arm may comprise an interface configured to connect to the tank. The tank may be positioned relative to the arm by rotating the rotatable structure to a selected position. The securing structure may be configured to secure the number of tanks to the rotatable structure when the securing structure engages the number of tanks. The tank may be moved to the desired position by lifting the tank from the rotatable structure and moving the arm about the plurality of axes to move the tank to the desired position. The tank may be rotated with respect to the arm with the interface connected to the tank.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
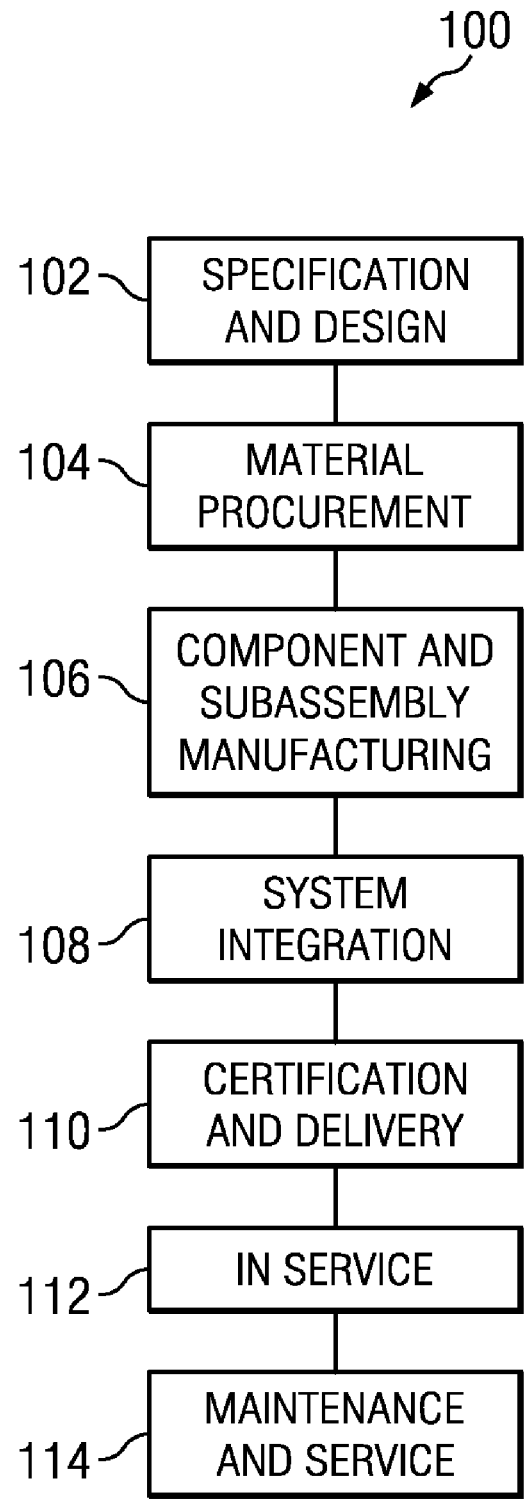
FIG. 1 is an illustration of an aircraft manufacturing and service method in accordance with an advantageous embodiment.

Referring more particularly to the drawings, embodiments of the disclosure may be described in the context of aircraft manufacturing and service method 100 as shown in FIG. 1, in which an illustration of an aircraft manufacturing and service method is depicted in accordance with an advantageous embodiment. During pre-production, aircraft manufacturing and service method 100 may include specification and design 102 of aircraft and material procurement 104.

During production, component and subassembly manufacturing 106 and system integration 108 of aircraft takes place. Thereafter, aircraft may go through certification and delivery 110 in order to be placed in service 112. While in service 112 by a customer, aircraft may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, without limitation, the operator may be a customer. For the purposes of this description, a system integrator may include, without limitation, any number of aircraft manufacturers and major-system subcontractors. A third party may include, for example, without limitation, any number of venders, subcontractors, and suppliers. An operator may be an airline, leasing company, military entity, service organization, and so on.

The different advantageous embodiments may be used in other manufacturing and service methods in addition to or in place of aircraft manufacturing and service method 100. For example, the advantageous embodiments may be applied to manufacturing and service methods for automobiles, ships, spacecraft, buildings, and other suitable manufacturing and service methods. Further, the different advantageous embodiments may be used in any process or operation in which tanks are moved, replaced, installed, removed, or otherwise manipulated.

Apparatus and methods embodied herein may be employed during at least one of the stages of aircraft manufacturing and service method 100 in FIG. 1. As used herein, the phrase "at least one of", when used with a list of items, means that different combinations of one or more of the listed items in any order may be used and only one of each item in the list may be needed. For example, "at least one of item A, item B, and item C" may include, for example, without limitation, item A or item A and item B in any order. This example also may include item A, item B, and item C in any order or item B and item C in any order.

In one illustrative example, components or subassemblies produced in component and subassembly manufacturing 106 may be fabricated or manufactured in a manner similar to components or subassemblies produced while aircraft is in service 112. As yet another example, a number of apparatus embodiments, method embodiments, or a combination thereof may be utilized during production stages, such as component and subassembly manufacturing 106 and system integration 108. A number, when referring to items, means one or more items. For example, a number of apparatus embodiments may be one or more apparatus embodiments. A number of apparatus embodiments, method embodiments, or a combination thereof may be utilized while aircraft is in service 112 and/or during maintenance and service 114. The use of a number of the different advantageous embodiments may substantially expedite the assembly of and/or reduce the cost of producing, operating, and/or maintaining an aircraft.

The different advantageous embodiments recognize and take into account a number of different considerations. For example, the different advantageous embodiments recognize and take into account that manual handling of tanks, such as fuel tanks, may be time-consuming and inefficient. Manual handling of fuel tanks requires caution.

The different advantageous embodiments recognize and take into account that devices currently available for use in moving fuel tanks may provide limited improvements in efficiency. Such devices may include a horizontal beam from which a fuel tank may be suspended by a chain or cable. The beam may be rotated about a single vertical axis with respect to a beam mounting point. These devices may not provide for the desired handling of fuel tanks. Additionally, these devices may not be capable of moving a fuel tank into a desired position.

The different advantageous embodiments recognize and take into account that a device may be used to move a fuel tank over a desired position. The device may then lower the tank into a desired position below the beam.

However, the different advantageous embodiments recognize and take into account that such a device may not be capable of moving a fuel tank into a position above the beam. In other words, the beam may not be capable of being positioned above the position where a fuel tank is to be placed. This situation may occur in cases where a fuel tank is to be loaded onto or removed from a vehicle or other equipment, and access to a compartment or other location for the fuel tank on the vehicle or other equipment is limited. In these cases, manual handling may be used instead to move the fuel tank into the desired position.

Thus, a number of different advantageous embodiments provide a method and apparatus for handling a tank, such as a fuel tank. An apparatus in accordance with an advantageous embodiment may comprise a platform, a rotatable structure on the platform, an arm associated with the platform, and an interface associated with the arm. The rotatable structure may be configured to hold a number of tanks. The arm may be configured to move about a plurality of axes. The interface may be configured to connect to a tank in the number of tanks. The arm may be configured to move the tank about the plurality of axes when the interface is connected to the tank, thereby to move the tank to a desired position.

Figure 2A:
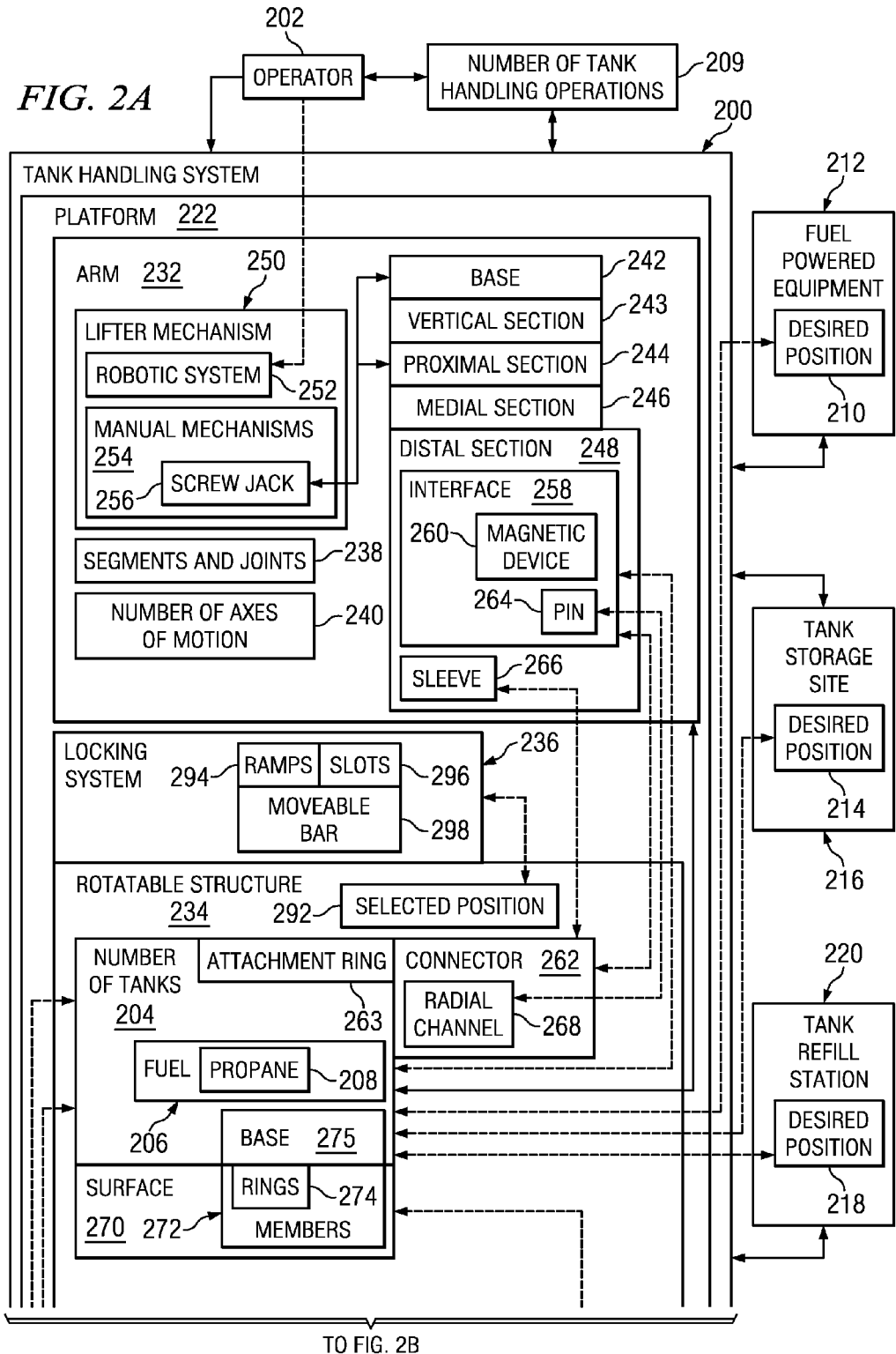
FIGS. 2A and 2B are illustrations of a tank handling system in accordance with an advantageous embodiment.
Figure 2B:
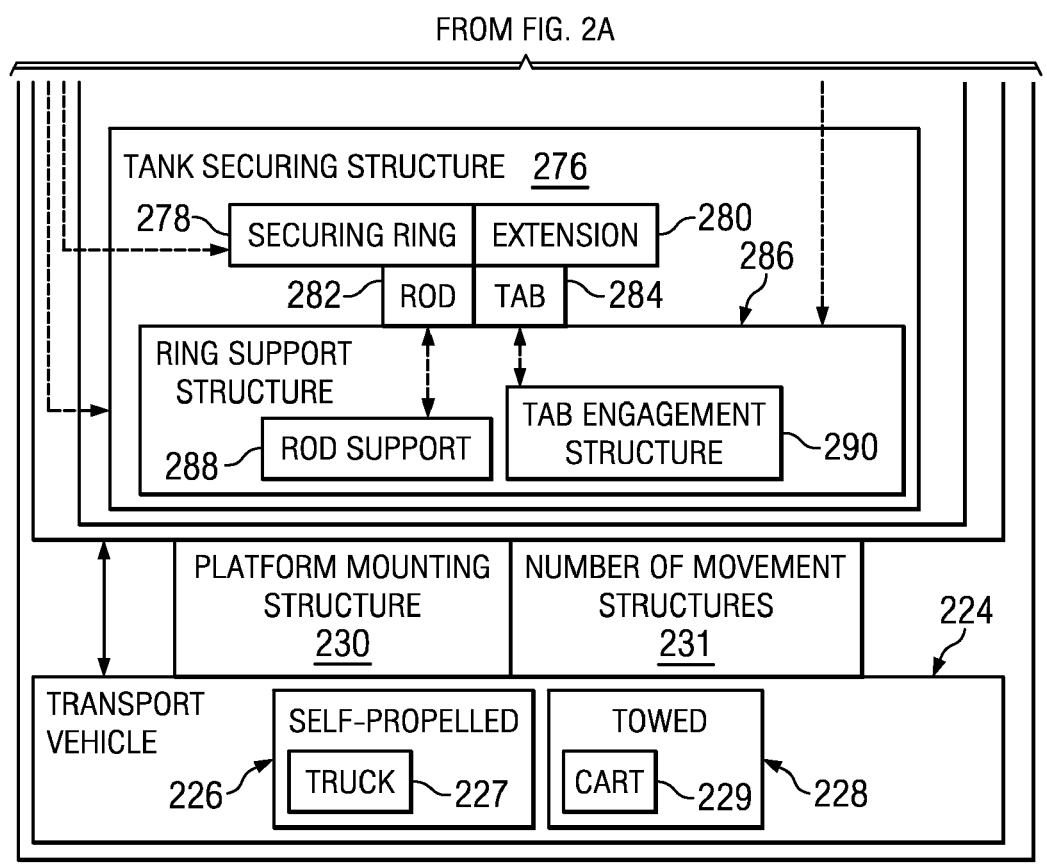

With reference to FIGS. 2A and 2B, illustrations of a tank handling system is depicted in accordance with an advantageous embodiment. Tank handling system 200 may be used by operator 202 to move number of tanks 204. Operator 202 may be, for example, without limitation, a human operator.

Number of tanks 204 may contain a number of materials. The number of materials may include, for example, without limitation, compressed or uncompressed liquids or gasses. As one illustrative example, number of tanks 204 may contain fuel 206. Fuel 206 may be, for example, without limitation, propane 208.

The size, shape, and weight of number of tanks 204 and the materials from which number of tanks 204 are fabricated may depend upon the material that number of tanks 204 are to contain.

Tank handling system 200 may be used by operator 202 to perform number of tank handling operations 209. Number of tank handling operations 209 may include, for example, without limitation, moving number of tanks 204 to and from desired position 210 in fuel powered equipment 212, to and from desired position 214 at tank storage site 216, and/or to and from desired position 218 at tank refill station 220. As one illustrative example, tank handling system 200 may be used to load and/or remove number of tanks 204 from fuel powered equipment 212.

Fuel powered equipment 212 may be any platform powered by fuel 206 contained in number of tanks 204. For example, without limitation, fuel powered equipment 212 may be at least one of a mobile platform, a stationary platform, a land-based structure, an aquatic-based structure, a space-based structure, a vehicle, an aircraft, a bus, a personnel carrier, a tank, a train, an automobile, a spacecraft, a surface ship, a power plant, a dam, a manufacturing facility, a building, or some other suitable object.

Additionally, operator 202 may use tank handling system 200 to perform number of tank handling operations 209 during at least one of aircraft component and subassembly manufacturing 106, aircraft system integration 108, aircraft certification and delivery 110, while an aircraft is in service 112, and during aircraft maintenance and service 114 in FIG. 1.

In accordance with an advantageous embodiment, tank handling system 200 may include platform 222. Platform 222 may provide a structure for supporting various other components of tank handling system 200. Platform 222 may be securely attached to transport vehicle 224. The attachment of platform 222 to transport vehicle 224 may be permanent or removable in these examples.

In these illustrative examples, transport vehicle 224 may be any moveable vehicle to which platform 222 may be attached. In this manner, transport vehicle 224 may be used to transport tank handling system 200 when platform 222 is attached to transport vehicle 224.

For example, without limitation, transport vehicle 224 may be used to transport tank handling system 200 to and from a number of locations. These locations may include, without limitation, fuel powered equipment 212, tank storage site 216, and tank refill station 220.

In these depicted examples, transport vehicle 224 may be any ground, water, and/or air transport vehicle. Transport vehicle 224 may be self-propelled 226 or towed 228. A vehicle that is self-propelled 226 may be, for example, without limitation, truck 227. When transport vehicle 224 is truck 227, platform 222 may be attached to a bed of truck 227. A vehicle that is towed 228 may be, for example, without limitation, cart 229. Cart 229 may be a cart that may be, for example, without limitation, towed by hand and/or by another vehicle, such as a truck.

Platform 222 may be permanently and/or removably attached to transport vehicle 224 using platform mounting structure 230 or any other suitable mounting structure. Alternatively, transport vehicle 224 may be formed by attaching number of movement structures 231 to platform 222 to form transport vehicle 224. Number of movement structures 231 may include at least one of, for example, without limitation, axles, wheels, a propulsion and drive system, and other suitable types of structures that provide movement.

In these illustrative examples, tank handling system 200 may include arm 232, rotatable structure 234, and locking system 236 mounted on platform 222. Number of tanks 204 may be supported on rotatable structure 234. Arm 232 may be used to move number of tanks 204 into at least one of desired positions 210, 214, and 218. Locking system 236 may be used to prevent rotation of rotatable structure 234.

Arm 232 may be formed by segments and joints 238. Segments and joints 238 allow arm 232 to be moved in number of axes of motion 240. Movement in number of axes of motion 240 allows arm 232 to be used to move number of tanks 204 into desired positions 210, 214, and 218. Desired positions 210, 214, and 218 may not be reached and/or access to desired positions 210, 214, and 218 may be limited when an unarticulated beam (not shown) is used in the place of arm 232.

As depicted in this example, arm 232 may include base 242. Base 242 may be mounted on platform 222. Base 242 may be mounted in a manner such that base 242 is rotatable with respect to platform 222. Vertical section 243 of arm 232 may be attached to base 242. Vertical section 243 may extend vertically upward from base 242 and thus from platform 222.

Proximal section 244 of arm 232 may be attached to vertical section 243. Proximal section 244 may be attached such that proximal section 244 is rotatable with respect to vertical section 243. Medial section 246 may be attached to proximal section 244. Medial section 246 may be attached such that medial section 246 is rotatable with respect to proximal section 244. Distal section 248 of arm 232 may be attached to medial section 246. Distal section 248 may be attached such that distal section 248 is rotatable with respect to medial section 246.

In these depicted examples, lifter mechanism 250 may be attached to and/or part of arm 232. Lifter mechanism 250 may be configured to move arm 232 in number of axes of motion 240. Lifter mechanism 250 may include any mechanical device or structure, or a combination of devices or structures that may be operated by operator 202 to move arm 232 in number of axes of motion 240.

For example, without limitation, lifter mechanism 250 may include robotic system 252. Robotic system 252 may be any robotic system employing motors and/or hydraulics. Robotic system 252 may be under direct control of operator 202 or under control of operator 202 via a computer or some other intervening system. In this illustrative example, arm 232 may be implemented as a robotic arm using conventional robotic arm components and methods of control.

Alternatively, lifter mechanism 250 may include manual mechanisms 254 that may be operated manually by operator 202. For example, without limitation, manual mechanisms 254 for lifter mechanism 250 may include screw jack 256. Screw jack 256 may be, for example, without limitation, a ball screw jack, a machine screw jack, or some other suitable type of screw jack. A ball screw jack may provide increased efficiency as compared to the machine screw jack.

Screw jack 256 may be connected between base 242 and proximal section 244 to provide for elevation and lowering of distal section 248 of arm 232 when screw jack 256 is operated.

In these illustrative examples, distal section 248 of arm 232 may include interface 258. Interface 258 may be used for connecting number of tanks 204 to arm 232. Number of tanks 204 may be moved in space about number of axes of motion 240 by moving arm 232 about number of axes of motion 240 with number of tanks 204 connected to arm 232 by interface 258. Interface 258 may include any structure for removably connecting number of tanks 204 to arm 232.

For example, without limitation, interface 258 may include magnetic device 260. Magnetic device 260 may employ one or more permanent magnets to connect arm 232 to number of tanks 204.

Alternatively, interface 258 may be configured to connect arm 232 to number of tanks 204 mechanically via connector 262. Connector 262 may be any mechanical structure that may be engaged by interface 258 to connect arm 232 to number of tanks 204. Connector 262 may be integrally formed as part of number of tanks 204. Alternatively, connector 262 may be attached to number of tanks 204 by a structure, such as attachment ring 263.

In this illustrative example, interface 258 may include pin 264. Pin 264 may be mounted on distal section 248. Pin 264 may be moved to engage and disengage connector 262. When pin 264 is engaged with connector 262, number of tanks 204 may be connected to arm 232.

Number of tanks 204 may be rotated with respect to distal section 248 when number of tanks 204 is connected to interface 258. Rotation may be facilitated by sleeve 266. Sleeve 266 may be mounted on distal section 248 and may be configured to receive connector 262.

Sleeve 266 may be made of a material that is configured to facilitate rotation of connector 262 in sleeve 266. For example, without limitation, sleeve 266 may be comprised of hardened steel, polytetrafluoroethylene, and/or some other suitable material.

Pin 264 may be configured to engage radial channel 268 formed in connector 262. Number of tanks 204 may be rotated while connected to arm 232 when connector 262 is received in sleeve 266 and pin 264 is engaged in radial channel 268.

Rotatable structure 234 may be rotatable with respect to platform 222. Rotatable structure 234 may include surface 270. Surface 270 may be configured to support number of tanks 204.

Surface 270 may include members 272. Members 272 may be configured to receive number of tanks 204. Members 272 also may be configured to prevent number of tanks 204 from sliding on surface 270. For example, without limitation, members 272 may include rings 274. Rings 274 may be attached to or formed in surface 270. Each of rings 274 may be configured in size and shape to receive base 275 of number of tanks 204. Number of tanks 204 may be prevented from sliding on surface 270 when base 275 of number of tanks 204 is received in one of rings 274.

Tank securing structure 276 may be provided on rotatable structure 234. Tank securing structure 276 may be configured to secure number of tanks 204 to rotatable structure 234 such that number of tanks 204 is not dislodged from rotatable structure 234 when rotatable structure 234 is rotated or when tank handling system 200 is moved. Tank securing structure 276 may be engaged to number of tanks 204 to secure number of tanks 204 to rotatable structure 234. Tank securing structure 276 may be disengaged from number of tanks 204 to allow number of tanks 204 to be removed from rotatable structure 234 when desired.

Tank securing structure 276 may be implemented as any structure that may be used to secure number of tanks 204 to rotatable structure 234. For example, without limitation, tank securing structure 276 may include at least one securing ring 278 and ring support structure 286.

Securing ring 278 may be configured to engage number of tanks 204. Securing ring 278 may be connected by extension 280 to rod 282. Tab 284 may be connected to at least one of extension 280 and rod 282 of securing ring 278.

Ring support structure 286 may be configured to support securing ring 278. Ring support structure 286 may be attached to surface 270. Ring support structure 286 may include rod support 288 and tab engagement structure 290.

Rod support 288 may be configured to support rod 282 for securing ring 278. Rod support 288 may be configured to allow securing ring 278 to be moved to engage securing ring 278 around number of tanks 204 or to remove securing ring 278 from number of tanks 204. For example, without limitation, rod support 288 may be configured to allow securing ring 278 to be moved vertically and rotationally.

Tab engagement structure 290 may be configured to receive tab 284. Tab engagement structure 290 may be configured such that rotational movement of securing ring 278 is prevented when tab 284 is received in tab engagement structure 290. Thus, number of tanks 204 may be secured to rotatable structure 234 by tank securing structure 276 when securing ring 278 engages number of tanks 204 and corresponding tab 284 is received in tab engagement structure 290.

Locking system 236 may be used to lock rotatable structure 234 into selected position 292. Selected position 292 may be a selected rotational position of rotatable structure 234. Any structure that may be engaged to lock rotatable structure 234 into selected position 292 and released to release rotatable structure 234 from selected position 292 may be used to implement locking system 236.

In one example, without limitation, locking system 236 may include ramps 294 and slots 296 in combination with moveable bar 298. Selected position 292 may be defined by the position of ramps 294 and slots 296 on rotatable structure 234. Moveable bar 298 may be mounted on platform 222 adjacent to rotatable structure 234. Moveable bar 298 may be configured to ride on ramps 294 and to drop automatically into one of slots 296 when rotatable structure 234 is rotated into selected position 292. Rotatable structure 234 may be locked in selected position 292 when moveable bar 298 is positioned in one of slots 296. Rotatable structure 234 may be unlocked by moveable bar 298 from slots 296.

The illustrations of tank handling system 200 in FIGS. 2A and 2B are not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, without limitation, in different advantageous embodiments, tank handling system 200 may include one or more arms. In other advantageous embodiments, arm 232 may be telescoping. In still other advantageous embodiments, arm 232 may be configured to connect to number of tanks 204 for lifting and moving more than one tank at the same time.

In some advantageous embodiments, fewer or more segments and joints 238 may form arm 232 to allow arm 232 to move in fewer or more, respectively, axes within number of axes of motion 240. Further, different segments and joints 238 may allow arm 232 to move in different axes within number of axes of motion 240.

In other advantageous embodiments, interface 258 may include a ratcheting strap mechanism (not shown) for connecting arm 232 to number of tanks 204. In still other advantageous embodiments, locking system 236 may include a spring-loaded locking structure (not shown). In some advantageous embodiments, operator 202 may be a robotic operator or a combination of a robotic operator with a human operator.

The different advantageous embodiments may not be limited to the handling of any particular type of tank in number of tanks 204. Further, the different advantageous embodiments may not be limited to handling number of tanks 204 that contain fuel 206 or propane 208 in particular.

With reference now to FIGS. 3-16, illustrations of a tank handling system are depicted in accordance with an advantageous embodiment. In these illustrative examples, tank handling system 300 may be an example of one implementation of tank handling system 200 in FIG. 2A.

Figure 3:
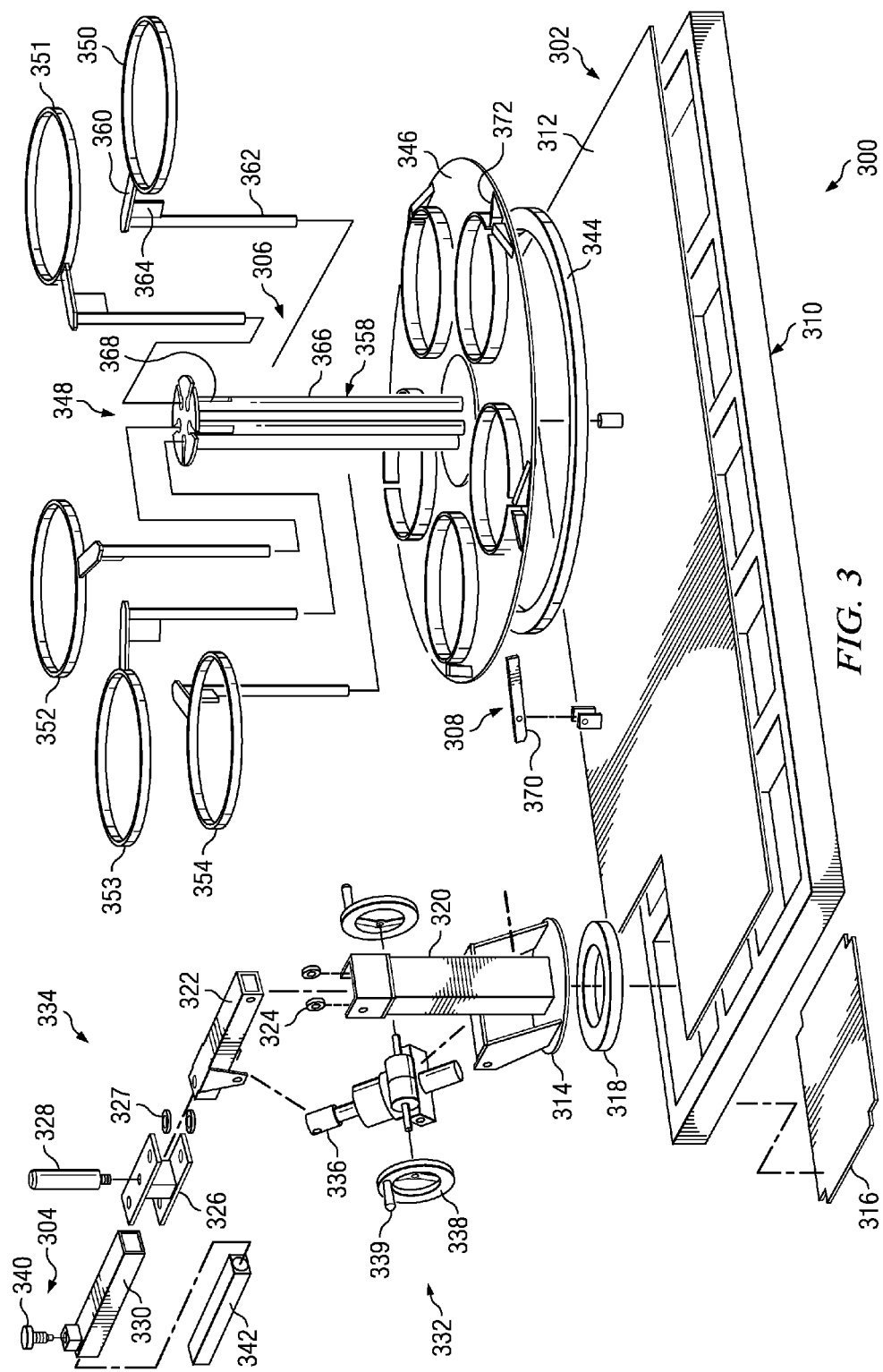
FIG. 3 is an illustration of a partially exploded perspective view of a tank handling system in accordance with an advantageous embodiment.

Turning now to FIG. 3, an illustration of an exploded perspective view of a tank handling system is depicted in accordance with an advantageous embodiment. In this illustrative example, tank handling system 300 may include platform 302, arm 304, rotatable structure 306, and locking system 308.

In this illustrative example, platform 302 may be an example of one implementation of platform 222 in FIG. 2. Arm 304 may be an example of one implementation of arm 232 in FIG. 2. Rotatable structure 306 may be an example of one implementation of rotatable structure 234 in FIG. 2. Locking system 308 may be an example of one implementation of locking system 236 in FIG. 2.

Platform 302 may include platform base 310 and platform plate 312. Arm 304 may include base 314, base plate 316, base bearing 318, vertical section 320, proximal section 322, proximal section bearings 324, medial section 326, medial section bearings 327, arm handle 328, distal section 330, lifter mechanism 332, and interface 334.

As depicted, proximal section 322 may be connected to vertical section 320 such that proximal section 322 may be rotated with respect to vertical section 320. Proximal section bearings 324 may be positioned at the connection between proximal section 322 and vertical section 320 to facilitate such rotational movement.

Medial section 326 may be connected to proximal section 322 and to distal section 330 such that medial section 326 may be rotated with respect to both proximal section 322 and distal section 330. Medial section bearings 327 may be positioned at the connections between medial section 326 and proximal section 322 and between medial section 326 and distal section 330 to facilitate such rotational movement.

As illustrated, lifter mechanism 332 may include screw jack 336, such as a ball screw jack, including at least one jack hand wheel 338 with handle 339. Interface 334 may include pin 340 and sleeve 342. Both pin 340 and sleeve 342 may be mounted in or supported on distal section 330.

Rotatable structure 306 may include rotatable structure bearing 344, rotatable structure base 346, and tank securing structure 348. Tank securing structure 348 may include securing rings 350, 351, 352, 353, and 354 and ring support structure 358. Securing ring 350 may be attached by extension 360 to rod 362. Tab 364 may extend from at least one of extension 360 and rod 362.

In this illustrative example, ring support structure 358 may include rod support 366 and tab engagement structure 368. Rod support 366 may be configured to support rod 362. Tab engagement structure 368 may be configured to receive tab 364. Locking system 308 may include moveable bar 370 and ramp/slot structures 372 on rotatable structure base 346.

Figure 4:
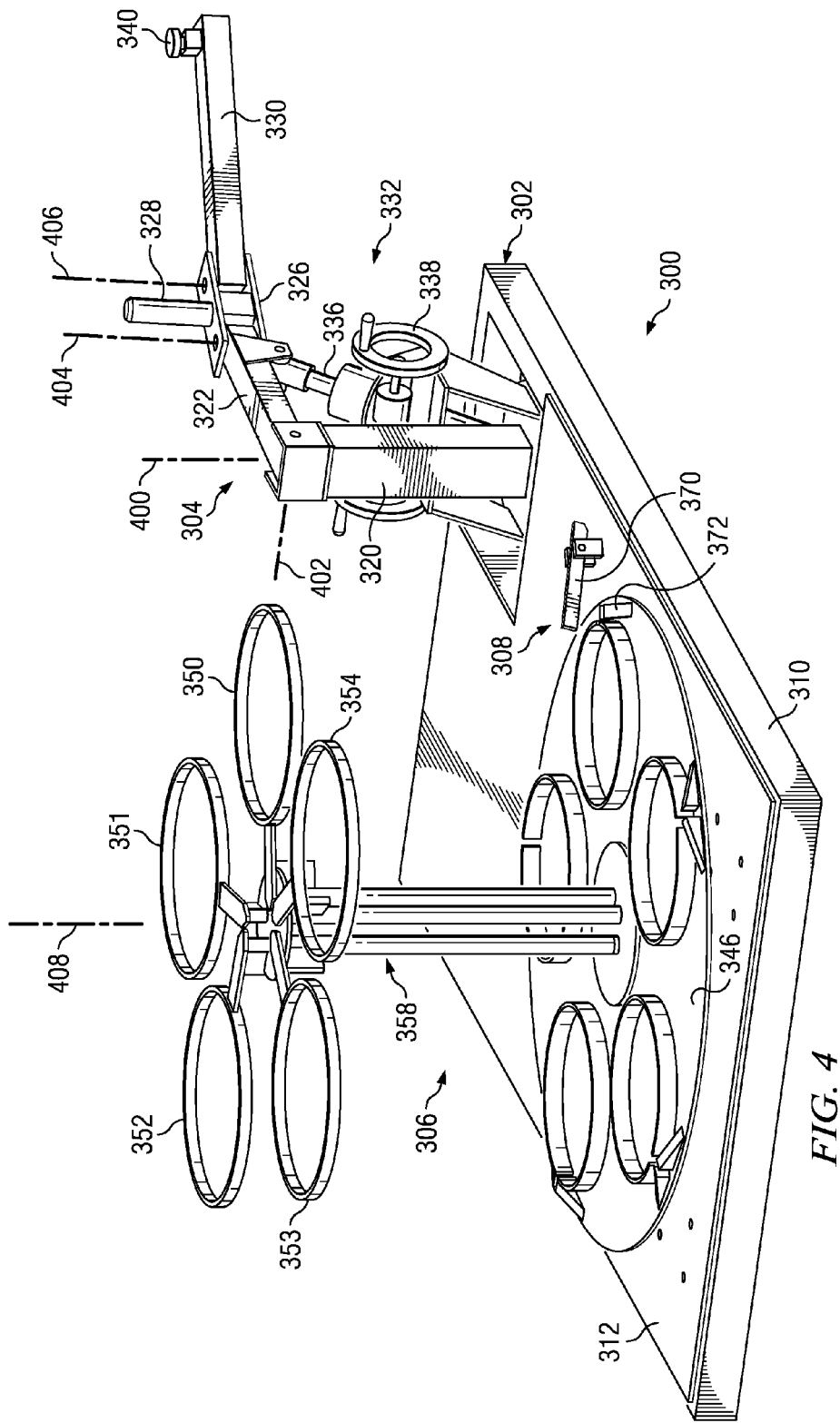
FIG. 4 is an illustration of a perspective view of the tank handling system in accordance with an advantageous embodiment.

Turning now to FIG. 4, an illustration of a perspective view of tank handling system 300 is depicted in accordance with an advantageous embodiment. In this illustrative example, a perspective view of tank handling system 300 may be seen from a different angle as compared to the angle for the view of tank handling system 300 in FIG. 3.

As illustrated in this example, platform plate 312 may be attached to platform base 310 to form platform 302. Arm 304 may be attached to platform 302 along with rotatable structure 306.

In this illustrative example, arm 304 may be mounted to platform 302 such that arm 304 may be rotatable with respect to platform 302 about an axis indicated by line 400. Proximal section 322 of arm 304 may be attached to vertical section 320 of arm 304 in a manner such that proximal section 322 may be rotatable about an axis indicated by line 402.

Further, medial section 326 may be attached to proximal section 322 in a manner such that medial section 326 may be rotatable about an axis indicated by line 404. Distal section 330 may be attached to medial section 326 in a manner such that distal section 330 may be rotatable about an axis indicated by line 406. In this manner, arm 304 may be moved about the plurality of axes indicated by lines 400, 402, 404, and 406.

Additionally, rotatable structure 306 may be mounted to platform 302 in a manner such that rotatable structure 306 may be rotatable with respect to platform 302 about an axis indicated by line 408.

Figure 5:
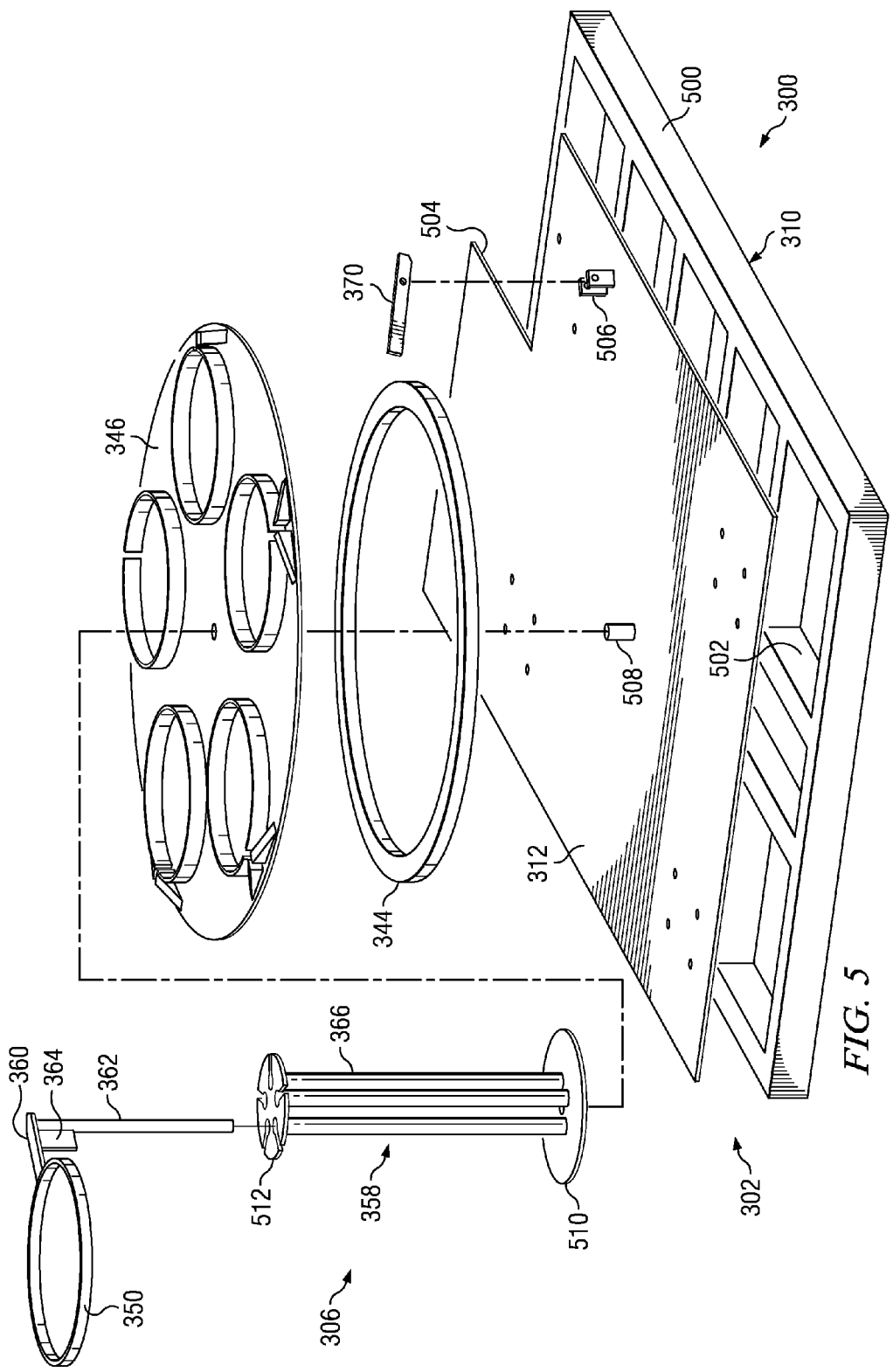
FIG. 5 is an illustration of an exploded perspective view of a platform and rotatable structure of a tank handling system in accordance with an advantageous embodiment.

Turning now to FIG. 5, an illustration of an exploded perspective view of platform 302 and rotatable structure 306 of tank handling system 300 is depicted in accordance with an advantageous embodiment.

Platform 302 may include platform base 310 and platform plate 312. Platform base 310 may be formed as outer frame 500 with internal ribs 502 connected to frame 500. Ribs 502 may provide structural rigidity to frame 500. Frame 500 and ribs 502 may be formed from any appropriate structural material by any appropriate method and may be joined together in any appropriate manner or by any appropriate method to form platform base 310. For example, without limitation, frame 500 and ribs 502 may be formed as hollow or solid structural steel bars that may be welded together to form platform base 310.

Platform plate 312 may be formed as a flat plate from structural steel or from any other appropriate material by any appropriate method of manufacture. Platform plate 312 may be attached to platform base 310 to form platform 302. For example, without limitation, platform plate 312 may be welded to frame 500 and ribs 502 of platform base 310. Platform plate 312 may include notch 504, such that platform plate 312 does not entirely cover platform base 310 when platform plate 312 is attached to platform base 310.

Bar support 506 may be attached to platform plate 312. Bar support 506 may be configured to hold bar 370 such that bar 370 is able to rotate with respect to bar support 506.

Rotatable structure support 508 may be attached to platform plate 312. Rotatable structure 306 may be mounted on platform plate 312 via rotatable structure support 508. Rotatable structure bearing 344 may be positioned on platform plate 312 around rotatable structure support 508.

For example, without limitation, rotatable structure bearing 344 may be a conventional ring-type bearing. Rotatable structure base 346 may be positioned on rotatable structure support 508 with rotatable structure bearing 344 positioned between rotatable structure base 346 and platform plate 312.

Ring support structure 358 of rotatable structure 306 may be attached to rotatable structure base 346. For example, without limitation, ring support structure 358 may include base plate 510 and top plate 512. Rod support 366 may be formed as a plurality of tubes extending between base plate 510 and top plate 512. Ring support structure 358 may be attached to rotatable structure base 346 by attaching base plate 510 to rotatable structure base 346 in any conventional and appropriate manner.

Only one securing ring 350 with corresponding extension 360, rod 362, and tab 364 is shown in FIG. 5. However, ring support structure 358 may be configured to support more than one securing ring.

Figure 6:
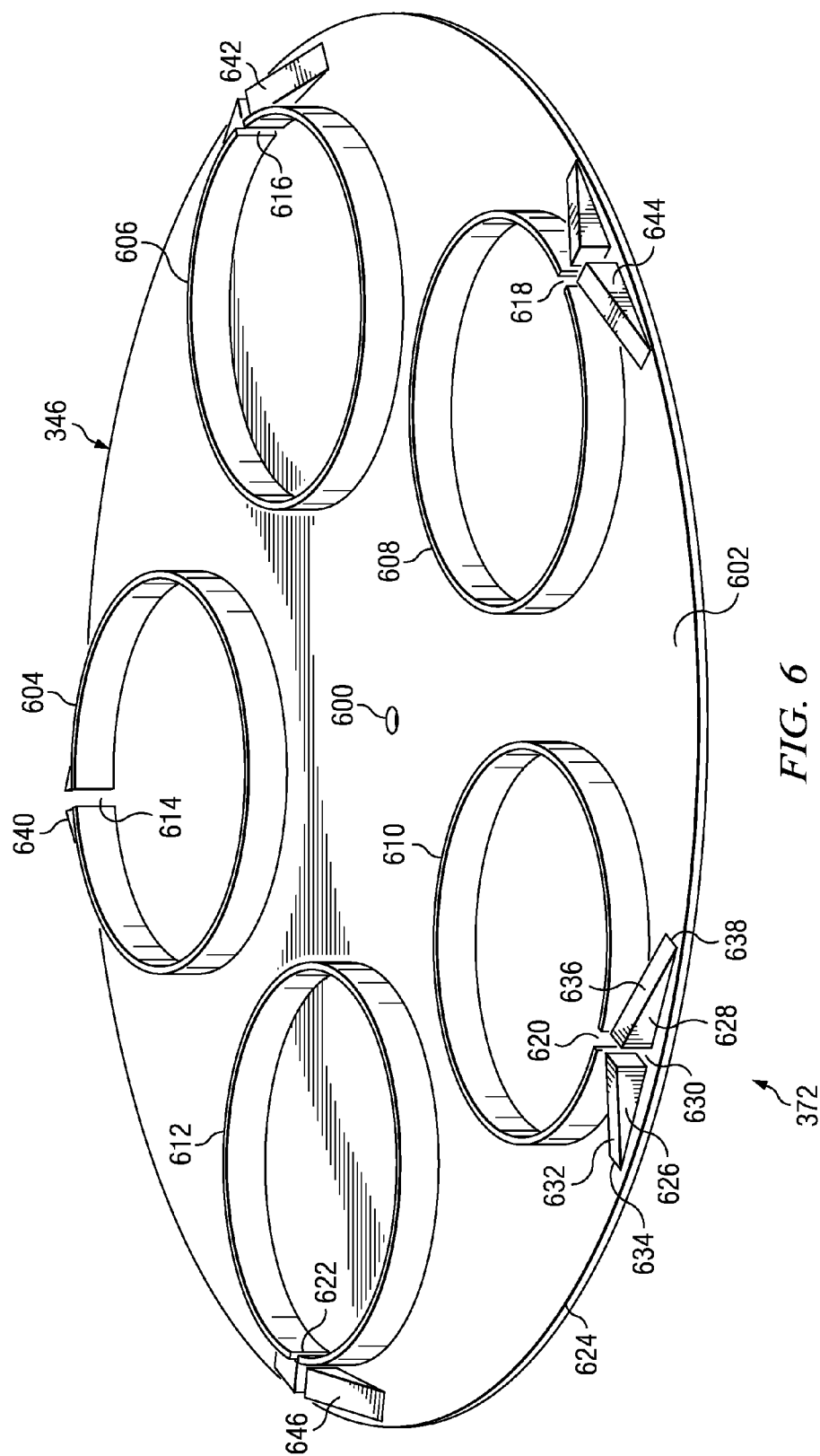
FIG. 6 is an illustration of a perspective view of a rotatable surface for a tank handling system in accordance with an advantageous embodiment.

Turning now to FIG. 6, an illustration of a perspective view of rotatable structure base 346 of tank handling system 300 is depicted in accordance with an advantageous embodiment. Rotatable structure base 346 may be formed as a circular disk from structural steel or from any other appropriate material by any appropriate method of manufacture. Mounting aperture 600 may be formed through the center of rotatable structure base 346. Mounting aperture 600 may be configured to receive rotatable structure support 508 in FIG. 5.

Rotatable structure base 346 may include surface 602. Plurality of members 604, 606, 608, 610, and 612 may be formed on or attached to surface 602. Members 604, 606, 608, 610, and 612 may be distributed evenly around the periphery of surface 602. For example, without limitation, members 604, 606, 608, 610, and 612 may take the form of raised rings on surface 602.

As illustrated, drain slots 614, 616, 618, 620, and 622 may be formed in members 604, 606, 608, 610, and 612, respectively. Drain slots 614, 616, 618, 620, and 622 preferably may be formed in a portion of members 604, 606, 608, 610, and 612 closest to peripheral edge 624 of surface 602. Drain slots 614, 616, 618, 620, and 622 may prevent debris and fluids, such as rain water, from collecting in members 604, 606, 608, 610, and 612.

In this illustrative example, ramp and slot structure 372 may be positioned on surface 602 at a position at or near peripheral edge 624 of surface 602. Ramp and slot structure 372, as illustrated, may be positioned between member 610 and peripheral edge 624. Ramp and slot structure 372 may be positioned at any other desired location on surface 602 at or near peripheral edge 624.

Ramp and slot structure 372 may include first ramp 626 and second ramp 628 attached to surface 602. First ramp 626 and second ramp 628 may be separated to define slot 630 between first ramp 626 and second ramp 628. Slot 630 may or may not be aligned with drain slot 620 in member 610.

First ramp 626 may include ramp surface 632, which may extend from above surface 602 at slot 630 down to surface 602 at opposite end 634 of first ramp 626 from slot 630. Second ramp 628 may include ramp surface 636, which may extend from above surface 602 at slot 630 down to surface 602 at opposite end 638 of second ramp 628 from slot 630.

In this depicted example, other ramp and slot structures, such as ramp and slot structures 640, 642, 644, and 646, may be implemented in a manner similar to ramp and slot structure 372. Further, ramp and slot structures 640, 642, 644, and 646 may be attached to surface 602 in relation to members 604, 606, 608, and 612, respectively, in a manner similar to how ramp and slot structure 372 is attached to surface 602 in relation to member 610.

For example, without limitation, ramp and slot structures 372, 640, 642, 644, and 646 may be positioned adjacent to members 610, 604, 606, 608, and 612, as illustrated. Alternatively, ramp and slot structures 372, 640, 642, 644, and 646 may be positioned substantially equidistant between members 610, 604, 606, 608, and 612 or at any other desired locations at or near peripheral edge 624 of surface 602.

Figure 7:
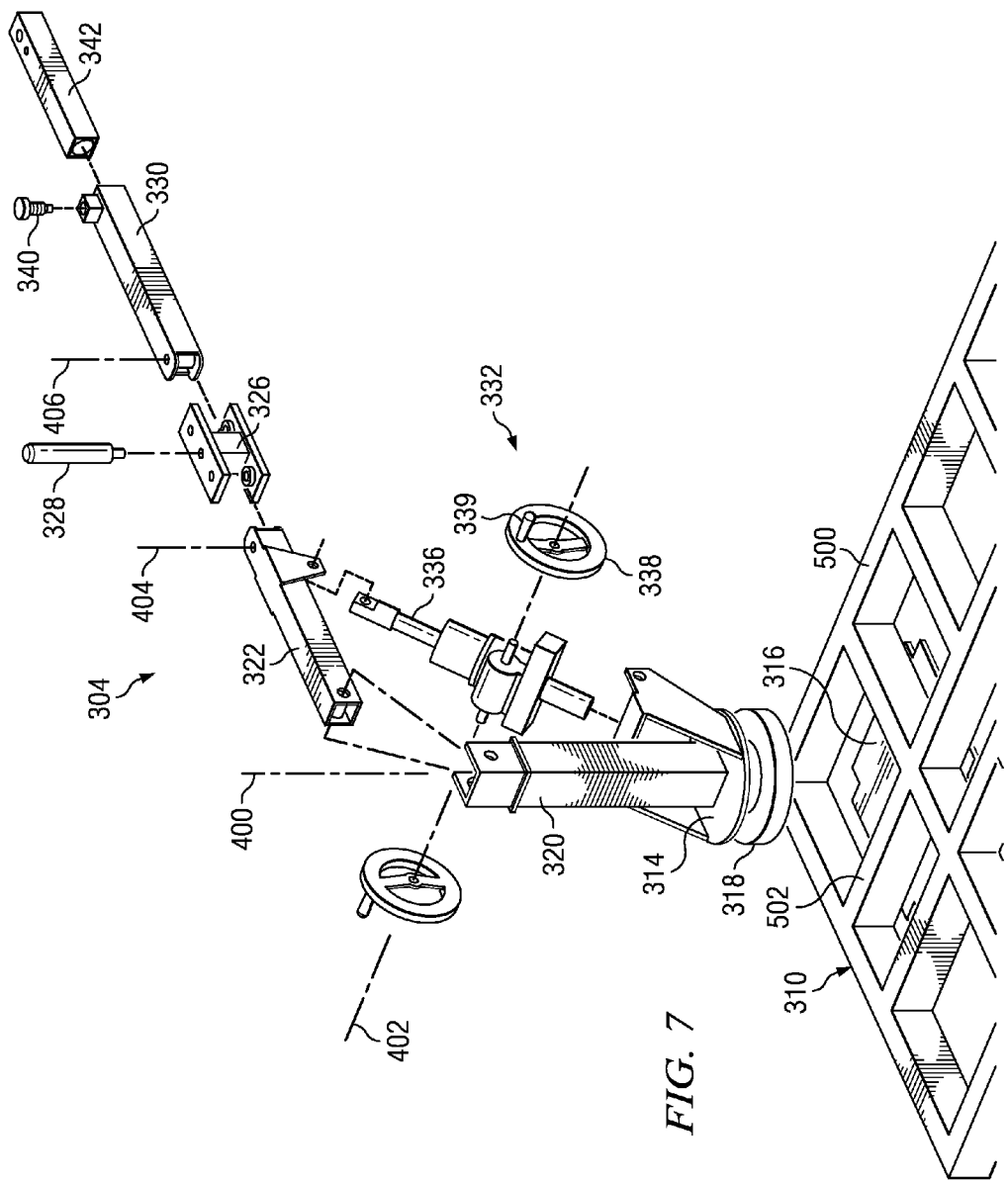
FIG. 7 is an illustration of an exploded perspective view of a portion of a platform and an arm of a tank handling system in accordance with an advantageous embodiment.

Turning now to FIG. 7, an illustration of an exploded perspective view of a portion of platform base 310 and arm 304 is depicted in accordance with an advantageous embodiment. As illustrated, base plate 316 may be attached to platform base 310 at a corner of platform base 310.

In these illustrative examples, base plate 316 may be formed as a plate made of structural steel or from any other appropriate material by any appropriate method of manufacture. Base plate 316 may be attached to a corner of frame 500 and adjacent ribs 502 by any appropriate method.

As depicted, arm 304 may be attached to platform base 310 by first attaching base bearing 318 to base plate 316 between frame 500 and adjacent ribs 502. Base bearing 318 may be a conventional ring-type bearing. Base 314 may be mounted on base bearing 318 such that arm 304 may be rotated with respect to platform base 310 about the axis indicated by line 400.

Vertical section 320 may be attached to and extend upward vertically along the axis indicated by line 400 from base 314.

In this example, without limitation, medial section 326 may be shorter than proximal section 322 and distal section 330. Medial section 326 may operate like a double-jointed elbow joint between proximal section 322 and distal section 330. Thus, arm 304 may be moved about the plurality of axes indicated by lines 400, 402, 404, and 406.

Arm 304 may be moved manually. For example, without limitation, arm 304 may be moved by manually grasping and moving arm 304. Arm handle 328 may be attached to medial section 326 on arm 304 to facilitate manual grasping and movement of arm 304. Screw jack 336 may be connected between base 314 and proximal section 322. This connection may allow proximal section 322 to move about the axis indicated by line 402 when hand wheel 338 is turned. The movement of proximal section 322 may lift or lower distal section 330 of arm 304.

Figure 8:
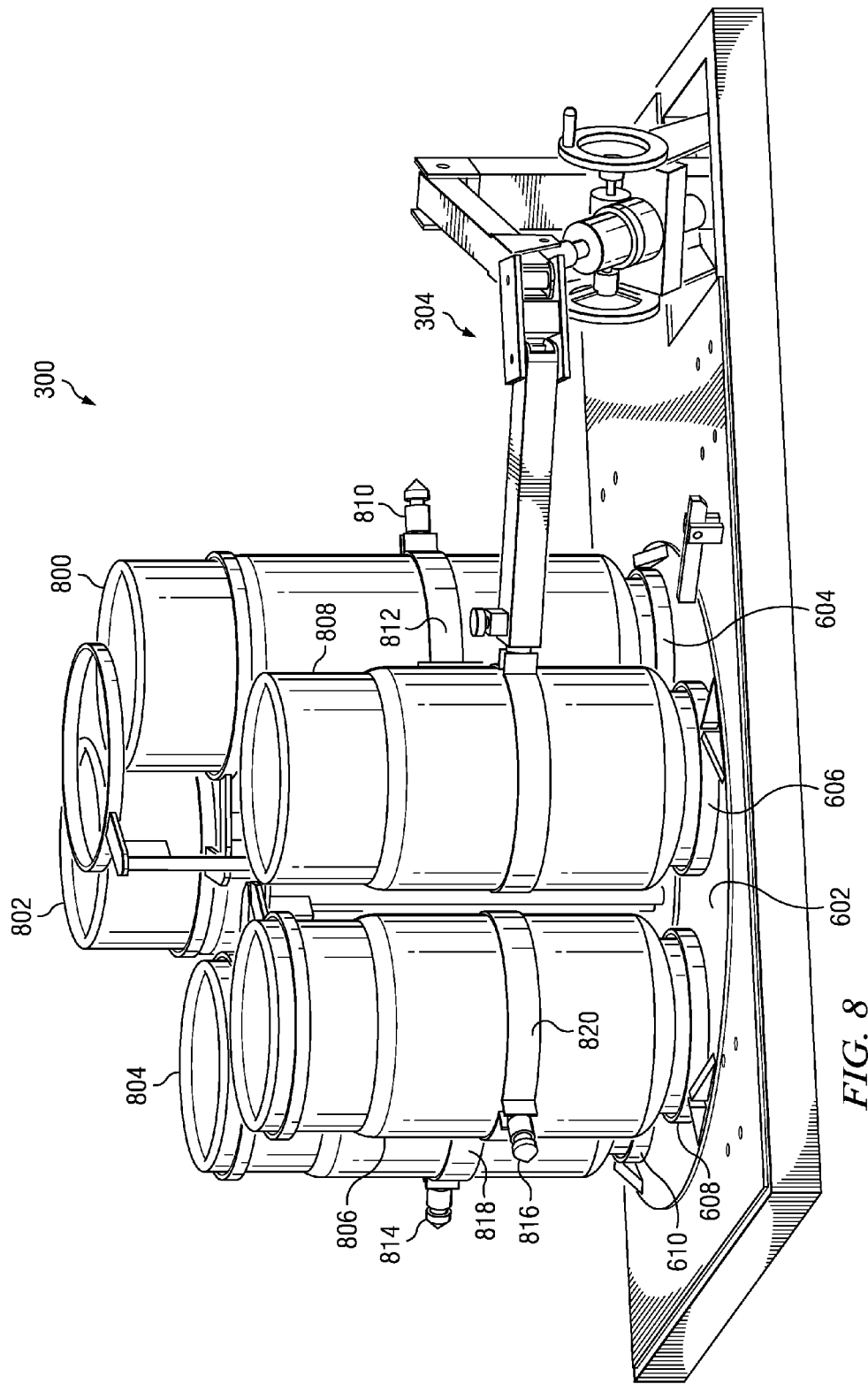
FIG. 8 is an illustration of a perspective view of a tank handling system with tanks in accordance with an advantageous embodiment.

With reference now to FIG. 8, an illustration of a perspective view of tank handling system 300 is depicted in accordance with an advantageous embodiment. In this illustrative example, tank handling system 300 may hold tanks 800, 802, 804, 806, and 808. Tanks 800, 802, 804, 806, and 808 may be fuel tanks containing fuel in the form of, for example, without limitation, propane.

For example, without limitation, tanks 800 and 802 may be 10.3 gallon propane tanks. Tanks 804, 806, and 808 may be 7.9 gallon propane tanks.

As depicted, tanks 800, 808, 806, and 804 may be positioned in members 604, 606, 608, and 610, respectively, on surface 602. Members 604, 606, 608, and 610 may prevent tanks 800, 808, 806, and 804 from sliding on surface 602. In FIG. 8, arm 304 is shown connected to tank 808.

Tank 800 may include connector 810. Connector 810 may allow arm 304 to be connected to tank 800. Connector 810 may project from tank 800, as depicted in this example. Connector 810 may be an integrally formed part of tank 800. Alternatively, connector 810 may be attached to tank 800 in any other appropriate manner.

For example, without limitation, connector 810 may be attached to tank 800 by attachment ring 812. Attachment ring 812 may extend around tank 800 to attach connector 810 to tank 800. Attachment ring 812 may be made from steel or from any other appropriate material by any appropriate method of manufacture. Tanks 804 and 806 may include similar connectors 814 and 816, respectively. Connectors 814 and 816 may be attached to tanks 804 and 806 by attachment rings 818 and 820, respectively.

Figure 9:
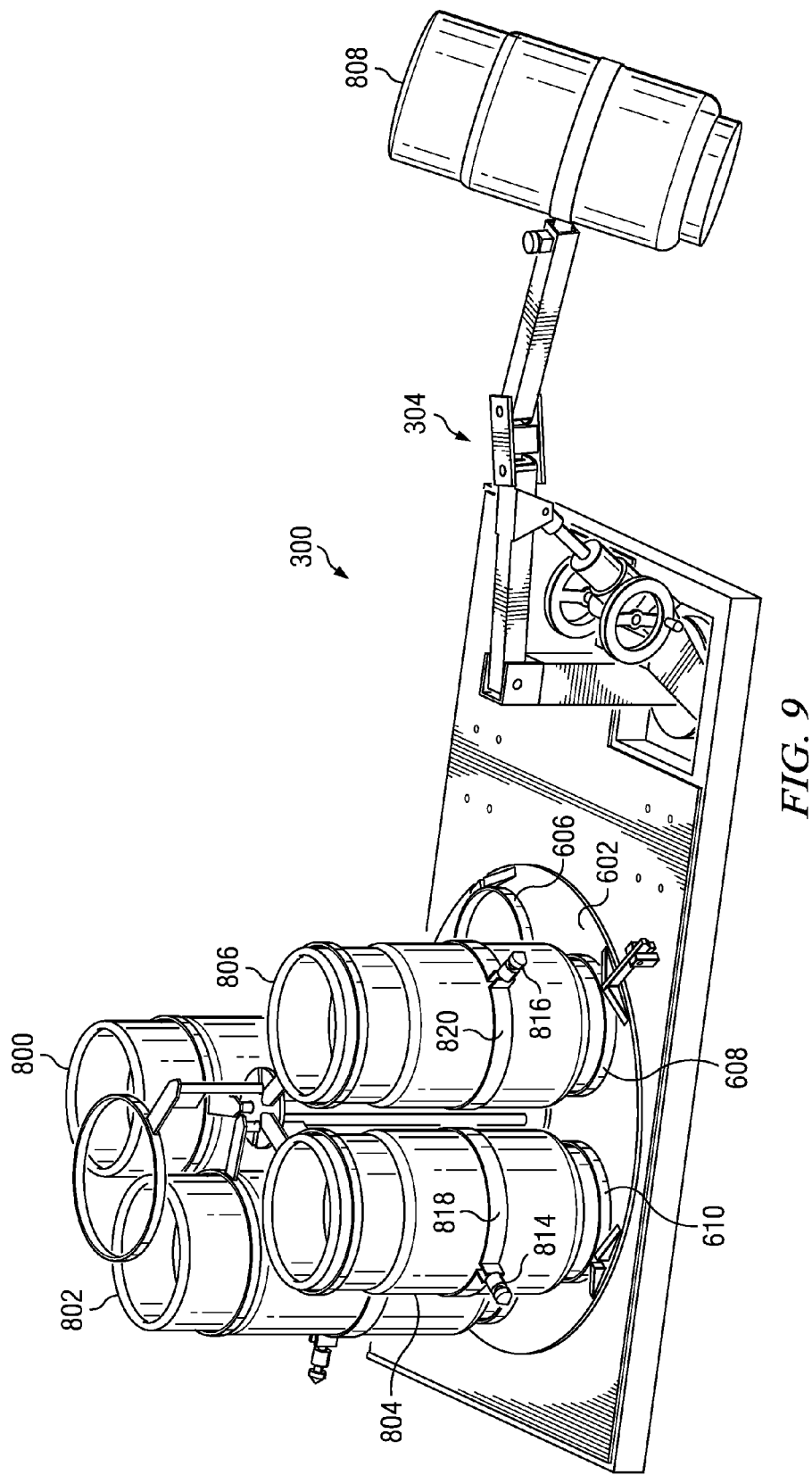
FIG. 9 is an illustration of a perspective view of the tank handling system in accordance with an advantageous embodiment of FIG. 8 shown in operation of moving a tank to a desired position.

With reference now to FIG. 9, an illustration of a perspective view of tank handling system 300 in operation is depicted in accordance with an advantageous embodiment. In this illustrative example, tank 808 may be connected to and moved by arm 304. As illustrated, tank 808 has been moved by arm 808 off of and away from surface 602 in this example.

Figure 10:
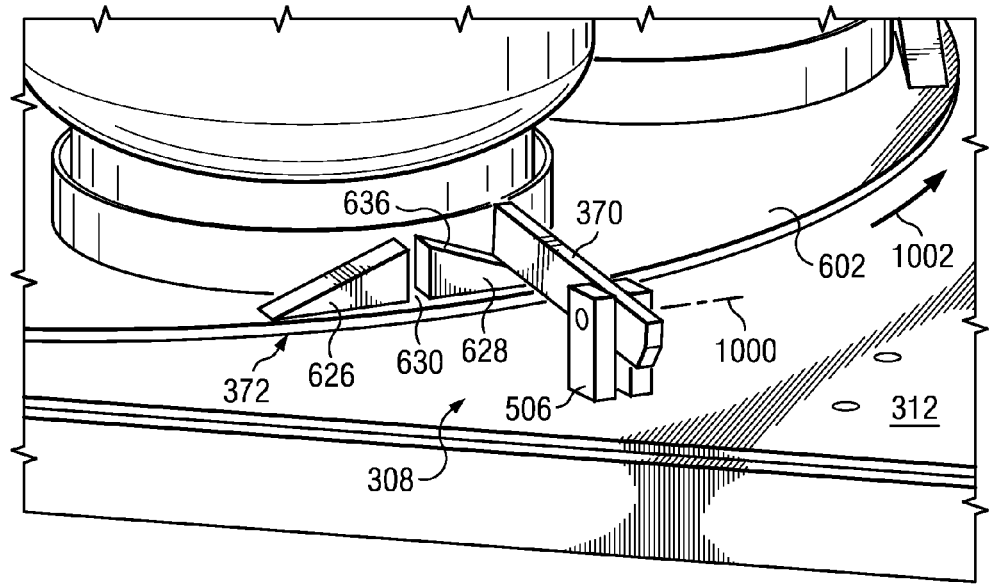
FIG. 10 is an illustration of a perspective view of a portion of a tank handling system in accordance with an advantageous embodiment showing in detail a locking system in an unlocked position.
Figure 11:
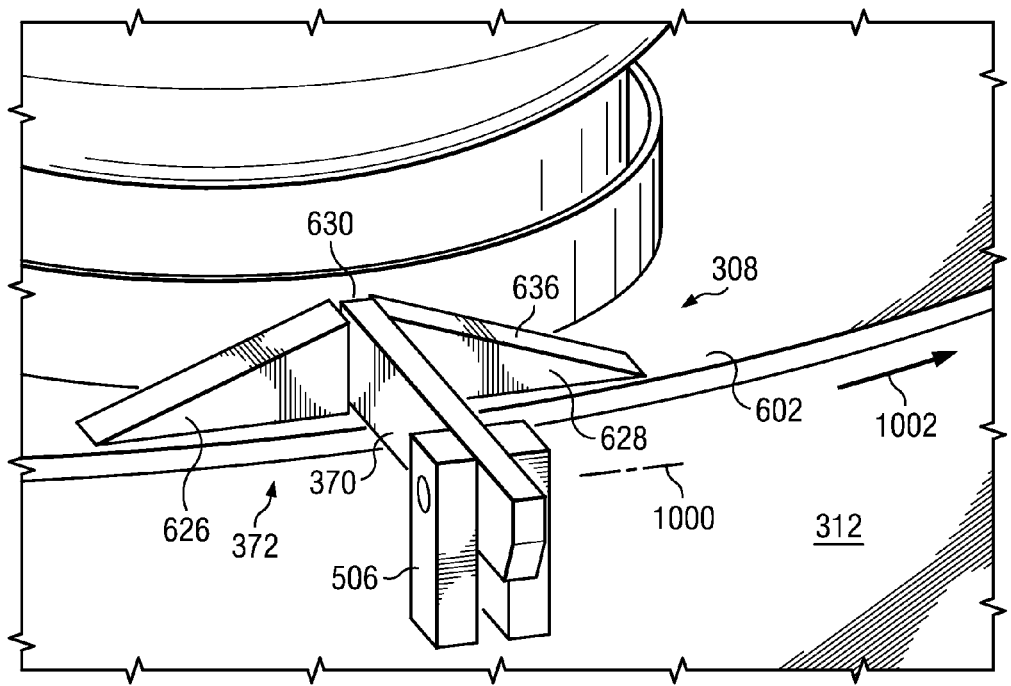
FIG. 11 is an illustration of a perspective view of a portion of a tank handling system in accordance with an advantageous embodiment showing in detail the locking system of FIG. 10 in a locked position.

With reference now to FIG. 10 and FIG. 11, illustrations of a perspective view of locking system 308 is depicted in accordance with an advantageous embodiment. Locking system 308 may include moveable bar 370 and ramp and slot structure 372. Moveable bar 370 may be mounted to bar support 506. Moveable bar 370 may be mounted to bar support 506 to allow bar 370 to rotate about an axis indicated by line 1000. Bar support 506 may be attached to platform plate 312 near rotatable surface 602.

In these illustrative examples, ramp and slot structure 372 may be mounted on surface 602. Ramp and slot structure 372 may include ramps 626 and 628, which define slot 630 between them. In FIG. 10, moveable bar 370 may not be positioned in slot 630. In this manner, rotatable surface 602 may be able to be rotated. As surface 602 rotates in the direction indicated by arrow 1002, moveable bar 370 may ride on ramp surface 636 of ramp 628.

Turning now to FIG. 11, when surface 602 is rotated such that moveable bar 370 is aligned with slot 630, moveable bar 370 may drop automatically into slot 630. With moveable bar 370 positioned in slot 630, rotatable surface 602 may be locked in position and not able to be rotated. Rotatable surface 602 may be unlocked for rotation by manually lifting bar 370 from slot 630.

Figure 12:
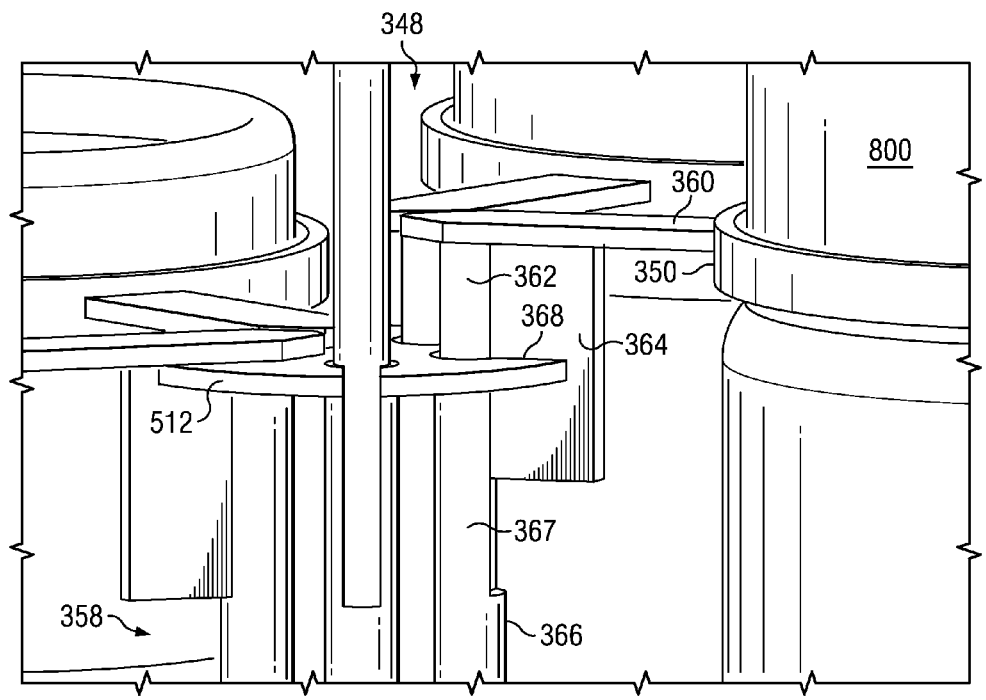
FIG. 12 is an illustration of a perspective view of a portion of a tank handling system in accordance with an advantageous embodiment showing in detail a portion of a tank securing structure.

With reference now to FIG. 12, an illustration of a perspective view of a portion of tank securing structure 348 is depicted in accordance with an advantageous embodiment. In this illustrative example, rod support 366 may be configured to receive and support rod 362. For example, without limitation, rod support 366 may be open-ended tube 367 extending downward from top plate 512. Rod support 366 thus may support rod 362 by positioning rod 362 in rod support tube 366. In this example, tab engagement structure 368 may be a slot formed in top plate 512 adjacent to rod support 366.

As illustrated in this example, securing ring 350 may be positioned around tank 800. Tab 364 may be positioned in tab engagement structure 368. With tab 364 positioned in tab engagement structure 368, rotational movement of securing ring 350 is prevented. Thus, movement of tank 800 may be prevented when securing ring 350 is positioned around tank 800 and tab 364 is positioned in tab engagement structure 368.

Figure 13:
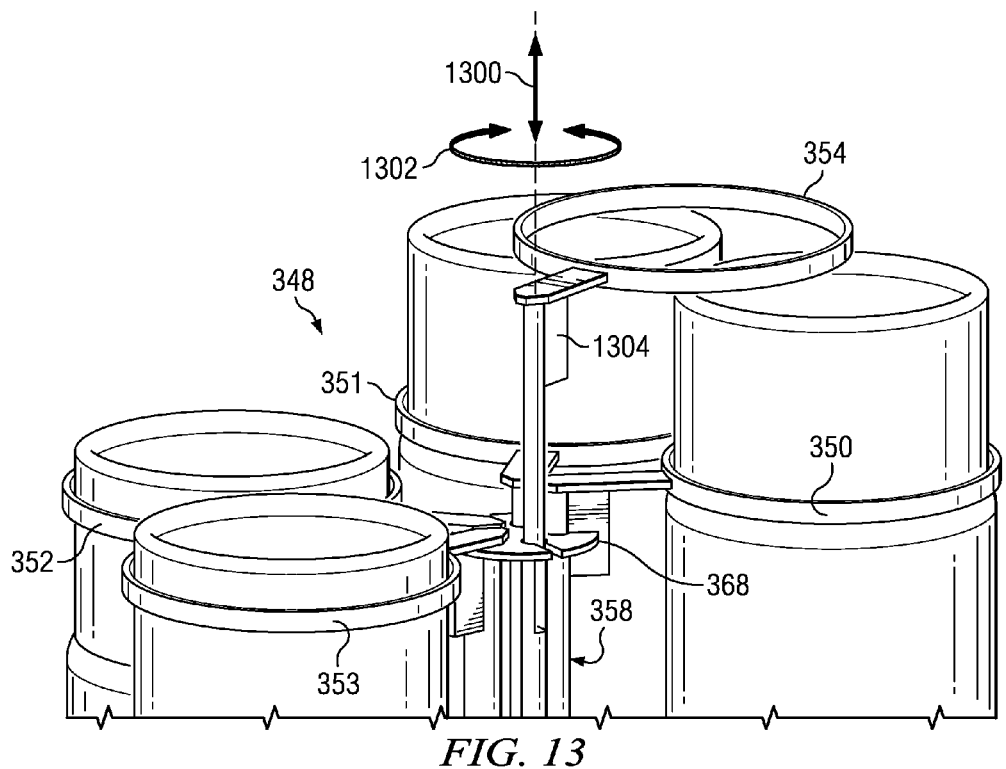
FIG. 13 is an illustration of a perspective view of a portion of a tank handling system in accordance with an advantageous embodiment showing in detail a portion of the tank securing structure of FIG. 12 from a different view.

With reference now to FIG. 13, an illustration of a perspective view of a portion of tank securing structure 348 is depicted in another view in accordance with an advantageous embodiment. Tank securing structure 348 may include ring support structure 358. Ring support structure 358 may provide support for securing rings 350, 351, 352, 353, and 354. In this illustrative example, securing structure 358 may be configured to allow securing rings 350, 351, 352, 353, and 354 to be moved as needed to secure tanks with securing structure 358 and to remove tanks from securing structure 358.

For example, without limitation, as illustrated in FIG. 13, securing structure 358 may be configured to allow securing ring 354 to be moved vertically in the directions indicated by arrow 1300 and to be rotated in the directions indicated by arrow 1302 when securing ring 354 is lifted to remove corresponding tab 1304 from tab engagement structure 368. When tab 1304 is positioned in tab engagement structure 368, rotational movement in the directions indicated by arrow 1302 may be prevented, while still permitting vertical movement in the directions indicated by arrow 1300.

Figure 14:
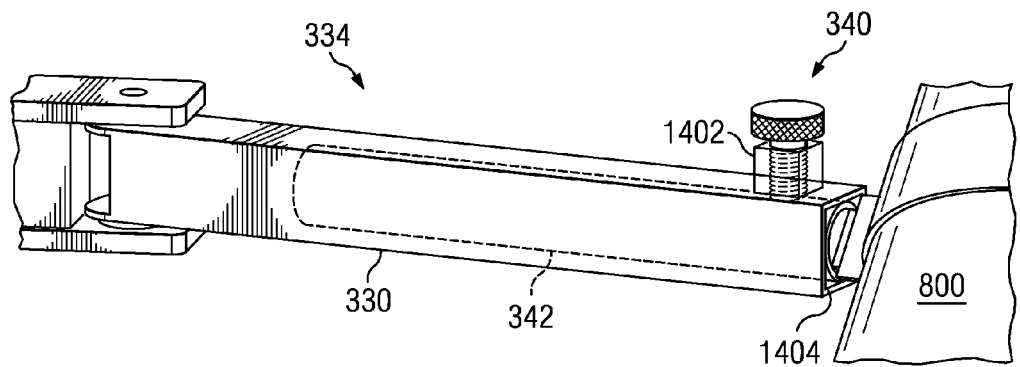
FIG. 14 is an illustration of a partial cut-away perspective view of a portion of a tank handling system in accordance with an advantageous embodiment showing in detail an interface.

With reference now to FIG. 14, an illustration of interface 334 is depicted in accordance with an advantageous embodiment. In this illustrative example, interface 334 may include pin 340 and sleeve 342. Pin 340 may be mounted in bushing 1402. Bushing 1402 may be mounted on distal section 330 near distal end 1404 of distal section 330. Bushing 1402 may be made of a material, such as, for example, without limitation, hardened steel.

Figure 15:
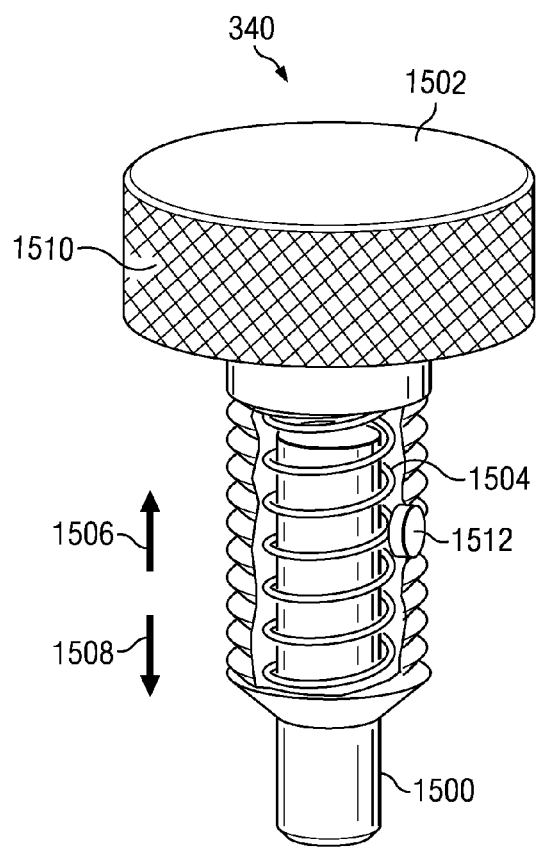
FIG. 15 is an illustration of a perspective view of a pin for use in an interface of a tank handling system in accordance with an advantageous embodiment.

With reference now to FIG. 15, an illustration of a more-detailed view of pin 340 is depicted in accordance with an advantageous embodiment. In this illustrative example, pin 340 may include shaft 1500, knob 1502, and spring 1504. Knob 1502 may be attached to shaft 1500 at one end of shaft 1500. Spring 1504 may be attached to knob 1502 and may be positioned around shaft 1500.

In this depicted example, knob 1502 may be used for grasping pin 340 and for pulling pin 340 by hand to move shaft 1500 in the direction indicated by arrow 1506. Shaft 1500 may be moved against a biasing force provided by spring 1504 in the direction indicated by arrow 1508.

Knurling 1510 may be provided on knob 1502 to make knob 1502 easier to grasp and pull by hand. Insert 1512 may be provided on spring 1504 to help resist removal of pin 340. Insert 1512 may be made of any appropriate material, such as nylon.

Figure 16:
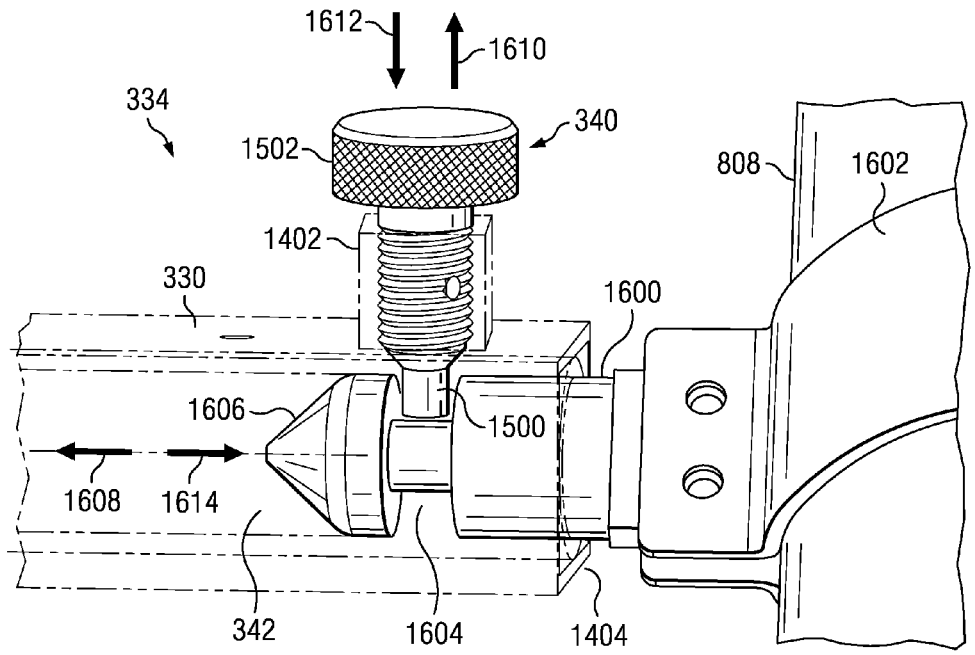
FIG. 16 is an illustration of a partial cut-away perspective view of a portion of a tank handling system in accordance with an advantageous embodiment showing in further detail the interface of FIG. 14 connected to a connector associated with a tank.

With reference now to FIG. 16, an illustration of interface 334 is depicted in more detail in accordance with an advantageous embodiment. In this illustrative example, sleeve 342 may be mounted in distal section 330 at or near distal end 1404 of distal section 330. Sleeve 342 may be configured to receive connector 1600.

As depicted, connector 1600 may be attached to tank 808 by attachment ring 1602. Connector 1600 may include radial channel 1604 formed around connector 1600. Pin 340 may be mounted in bushing 1402 in a manner such that spring 1504 biases shaft 1500 into radial channel 1604 when connector 1600 is received in sleeve 342.

With shaft 1500 positioned in radial channel 1604, connector 1600 may be rotatable in sleeve 342. Thus, tank 808 may be rotated with respect to distal section 330 when tank 808 is connected by interface 334 to distal section 330.

Sleeve 342 may be made of a material that is configured to facilitate rotation of connector 1600 in sleeve 342. For example, without limitation, sleeve 342 may be comprised of hardened steel or a high-density polyethylene material.

Conical end 1606 of connector 1600 may be formed in the shape of a cone to facilitate connecting connector 1600 to interface 334. For example, without limitation, as connector 1600 moves into sleeve 342 in the direction indicated by arrow 1608, conical end 1606 of connector 1600 may contact shaft 1500 of pin 340. As connector 1600 continues to move into sleeve 342, conical end 1606 may force shaft 1500 outwards, in the direction indicated by arrow 1610.

When connector 1600 is moved into sleeve 342 such that shaft 1500 is aligned with radial channel 1604, shaft 1500 may snap into radial channel 1604 automatically. Shaft 1500 may snap into radial channel 1604 automatically due to the bias of spring 1504 in the direction indicated by arrow 1612. With shaft 1500 in radial channel 1604, connector 1600, and thus tank 808, may be connected securely to distal section 330.

To remove tank 808 from distal section 330, an operator may grasp pin 340 by knob 1502 and pull in the direction indicated by arrow 1610. Pulling on knob 1502 with sufficient force to overcome the bias of spring 1504 may pull shaft 1500 from radial channel 1604.

With shaft 1500 removed from radial channel 1604, tank 808 may be removed from distal section 330. The removal may occur by moving tank 808 in the direction indicated by arrow 1614 or moving distal section 330 in the direction indicated by arrow 1608.

The illustrations of tank handling system 300 and the components thereof in FIGS. 3-16 may be examples, without limitation, of possible implementations of an advantageous embodiment. Tank handling systems, in accordance with other advantageous embodiments, may include fewer components and/or other components in addition to and/or in place of those illustrated.

For example, without limitation, other advantageous embodiments may support more or fewer tanks. Other advantageous embodiments may support tanks having different sizes and/or shapes from those illustrated. In still other advantageous embodiments, multiple arms may be used to move multiple tanks at the same time and/or a single arm with multiple interfaces may be used to move multiple tanks at the same time.

In some other advantageous embodiments, one or more arms for moving tanks may have more or fewer components and may be configured to move in more, fewer, and/or different axes of motion from those described in detail above.

Figure 17:
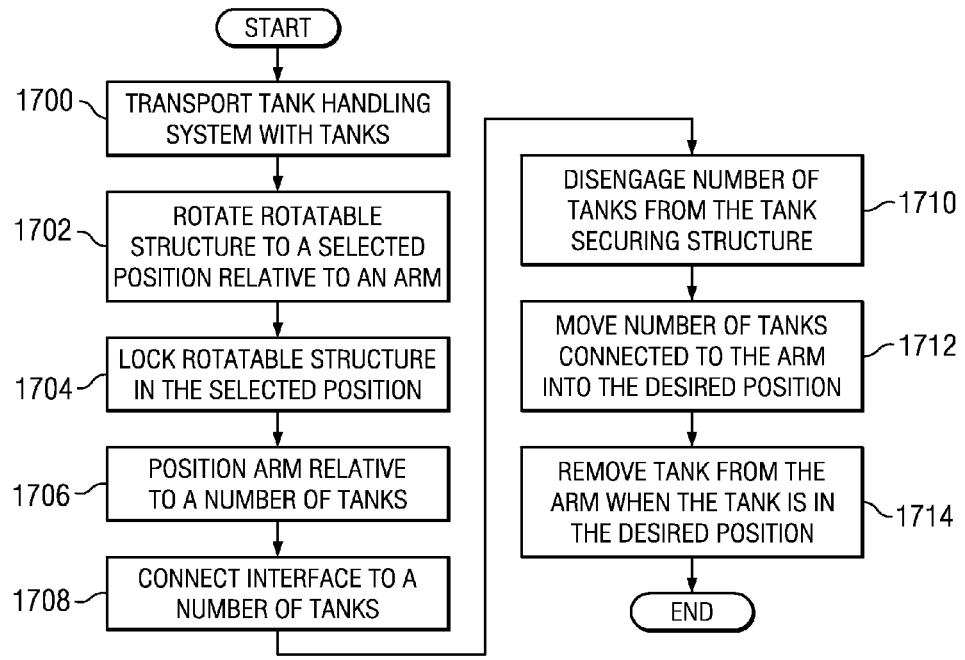
FIG. 17 is an illustration of a flowchart for a method of handling a tank in accordance with an advantageous embodiment.

With reference now to FIG. 17, an illustration of a flowchart of a process for handling a tank is depicted in accordance with an advantageous embodiment. The process illustrated in FIG. 17 may be implemented by operator 202 using tank handling system 200 in FIG. 2A.

The process may begin by transporting tank handling system 200 with one or more of number of tanks 204 held on tank handling system 200 (operation 1700). Operation 1700 may include moving transport vehicle 224 in FIG. 2B on which tank handling system 200 is mounted to a location at which number of tanks 204 is to be delivered. The location may be, for example, without limitation, the location of fuel powered equipment 212, tank storage site 216, or tank refill station 220.

With tank handling system 200 at a desired location, rotatable structure 234 may be rotated to selected position 292 with respect to arm 232 (operation 1702). Operation 1702 may be performed to position number of tanks 204 to facilitate connection of arm 232 to number of tanks 204. Rotatable structure 234 may then be locked in selected position 292 (operation 1704). Operation 1704 may be performed to prevent movement of number of tanks 204 with respect to arm 232, while arm 232 is being connected to number of tanks 204.

Operation 1704 may be performed using locking system 236. For example, without limitation, operations 1702 and 1704 may include rotating rotatable structure 234 to selected position 292 such that moveable bar 298 drops into one of slots 296 to lock rotatable structure 234 into selected position 292.

Arm 232 may be positioned relative to number of tanks 204 (operation 1706). For example, without limitation, operation 1706 may include moving arm 232 to align interface 258 with connector 262 on number of tanks 204 to be moved. Interface 258 may then be connected to number of tanks 204 to connect number of tanks 204 to arm 232 (operation 1708). Operation 1708 may include connecting interface 258 to connector 262 on number of tanks 204 such that connector 262 is positioned in sleeve 266 with pin 264 engaging radial channel 268 formed in connector 262.

Number of tanks 204 may then be disengaged from tank securing structure 276 (operation 1710). Operation 1710 may be performed to release number of tanks 204 from tank securing structure 276 so that number of tanks 204 may be moved from rotatable structure 234 by operation of arm 232. Operation 1710 may include lifting securing ring 278 from number of tanks 204. Lifting securing ring 278 from number of tanks 204 may both remove securing ring 278 from around number of tanks 204 and disengage tab 284 from tab engagement structure 290. With tab 284 disengaged from tab engagement structure 290, securing ring 278 may be rotated away from number of tanks 204.

With number of tanks 204 connected to arm 232, arm 232 may be moved about number of axes of motion 240, thereby moving number of tanks 204 into a desired position (operation 1712). For example, without limitation, operation 1712 may include moving number of tanks 204 into desired position 210 on fuel powered equipment 212, into desired position 214 at tank storage site 216, or to desired position 218 at tank refill station 220.

Operation 1712 may include moving arm 232 in one or more number of axes of motion 240 to lift number of tanks 204 from rotatable structure 234 and to move number of tanks 204 to desired positions 210, 214, or 218. Desired positions 210, 214, and/or 218 may be a position located above tank handling system 200. More specifically, desired positions 210, 214, or 218 may be a position located above arm 232. Operation 1712 also may include rotating number of tanks 204 with respect to distal section 248 of arm 232.

When a tank in number of tanks 204 is moved into desired position 210, 214, and/or 218 by movement of arm 232, number of tanks 204 may be removed from arm 232 (operation 1714). Operation 1714 may include, for example, without limitation, disconnecting interface 258 from connector 262 on a tank in number of tanks 204. More particularly, operation 1714 may include removing pin 264 from radial channel 268 in connector 262 and moving arm 232 away from connector 262 or moving number of tanks 204 away from arm 232.

One or more of the advantageous embodiments provides a capability for handling tanks, such as fuel tanks, using a mechanical arm that may be moved about a number of axes. Tank handling, in accordance with advantageous embodiments, allows tanks to be moved using the mechanical arm to desired positions that may be inaccessible to other tank handling devices. Tank handling, in accordance with advantageous embodiments, may be performed more rapidly by a fewer number of human operators. Thus, the different advantageous embodiments provide more efficient and cost-effective tank handling. All of these advantages of tank handling, in accordance with advantageous embodiments, may be achieved with increased safety.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or portion of an operation or step. In some alternative implementations, the function or functions noted in the block may occur out of the order noted in the figures. For example, without limitation, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a platform;
    a structure on the platform configured to hold a number of tanks;
    a tank securing structure on the structure, the tank securing structure configured to hold the number of tanks on the structure, the tank securing structure comprising: a plurality of rings, such that each ring in the plurality of rings is configured to hold a tank, a rod attached by an extension to each ring in the plurality of rings, and a rod support on a ring support structure, such that the rod support is configured to support the rod and to allow vertical movement of the rod, and the ring support structure is configured to support the plurality of rings;
    an arm associated with the platform and configured to move about a plurality of axes; and
    an interface associated with the arm and configured to connect to the tank in the number of tanks in which the arm is configured to move the tank about the plurality of axes when the interface is connected to the tank.

2. The apparatus of claim 1, further comprising: a vehicle, wherein the platform is mounted on the vehicle.

3. The apparatus of claim 1, wherein the structure is a rotatable structure and comprises:
    a rotatable surface; and
    a number of members, wherein each member in the number of members is configured to receive the tank in the number of tanks to hold the tank on the rotatable surface.

4. The apparatus of claim 3, wherein the each member in the number of members comprises a ring on the rotatable surface, wherein the ring is configured to receive a base of the tank.

5. The apparatus of claim 1 further comprising:
a tab extending from at least one of the rod and the extension associated with the each ring in the plurality of rings; and
a tab engagement structure on the ring support structure, such that the tab engagement structure is configured to receive the tab to prevent rotational movement of a ring when the tab associated with the ring is received in the tab engagement structure.

6. The apparatus of claim 1, wherein the interface is configured to connect to a connector associated with the tank.

7. The apparatus of claim 6, wherein the connector is associated with an attachment ring configured to receive the tank.

8. The apparatus of claim 6, wherein the interface includes a moveable pin configured to engage a radial channel formed in the connector.

9. The apparatus of claim 8, wherein the interface further comprises: a sleeve configured to receive the connector, wherein the sleeve allows rotation of the tank connected to the arm when the moveable pin is engaged in the radial channel formed in the connector.

10. The apparatus of claim 1, wherein the arm comprises:
a plurality of segments; and
a number of joints connecting the plurality of segments to each other to form the arm.

11. The apparatus of claim 1, wherein the structure is a rotatable structure and further comprising:
a locking system configured to lock the rotatable structure in a position.

12. The apparatus of claim 11, wherein the locking system comprises:
a plurality of ramps on the rotatable structure;
a slot in each of the plurality of ramps; and
a moveable bar associated with the platform, wherein the moveable bar is configured to drop into the slot and hold the rotatable structure in a selected position when the rotatable structure moves to the selected position.

13. An apparatus comprising:
a vehicle;
a platform mounted on the vehicle;
a rotatable structure on the platform, in which the rotatable structure is configured to hold a number of tanks and comprises a rotatable surface and a number of members, in which each member in the number of members comprises a ring on the rotatable surface, in which the ring is configured to receive a base of a tank in the number of tanks to hold the tank on the rotatable surface;
a tank securing structure on the rotatable structure, in which the tank securing structure is configured to hold the number of tanks on the rotatable structure and comprises a plurality of securing rings, in which each securing ring in the plurality of securing rings is configured to hold a fuel tank, a rod attached by an extension to the each securing ring, a tab extending from at least one of the rod and the extension associated with the each securing ring, a ring support structure on the rotatable surface, a rod support on the ring support structure, in which the rod support is configured to support the rod and to allow vertical movement of the rod, and a tab engagement structure on the ring support structure, in which the tab engagement structure is configured to receive the tab to prevent rotational movement of a securing ring when the tab associated with the securing ring is received in the tab engagement structure;
a locking system, in which the locking system is configured to lock the rotatable structure in a position and comprises a plurality of ramps on the rotatable structure, a slot in each of the plurality of ramps, and a moveable bar associated with the platform, in which the moveable bar is configured to drop into the slot and hold the rotatable structure in a selected position when the rotatable structure moves to the selected position;
an arm associated with the platform, in which the arm is configured to move about a plurality of axes and comprises a plurality of segments and a number of joints; and
an interface associated with the arm, in which the interface is configured to connect to a connector associated with the tank in the number of tanks, in which the connector is associated with an attachment ring, in which the attachment ring is configured to receive the tank, and in which the interface includes a moveable pin, in which the moveable pin is configured to engage a radial channel formed in the connector, and a sleeve, in which the sleeve is configured to receive the connector to allow rotation of the tank connected to the arm when the moveable pin is engaged in the radial channel formed in the connector, and in which the arm is configured to move the tank about the plurality of axes when the interface is connected to the tank.

14. A method of handling a tank comprising:
securing the tank, using a tank securing structure, on a structure on a platform, the tank securing structure configured to hold a number of tanks on the structure, such that the tank securing structure comprises: a plurality of rings, such that each ring in the plurality of rings is configured to hold a tank, a rod attached by an extension to each ring in the plurality of rings, and a rod support on a ring support structure;
supporting the rod, using the rod support, such that the rod support is configured to allow vertical movement of the rod;
supporting the plurality of rings, using the ring support structure;
positioning an arm relative to the tank held by the structure on the platform in which the structure is configured to hold the number of tanks, in which the arm is associated with the platform and configured to move about a plurality of axes, and in which the arm has an interface configured to connect to the tank;
connecting the tank to the interface; and
moving the arm such that the tank is moved into a desired position.

15. The method of claim 14, wherein the step of moving the arm such that the tank is moved into the desired position comprises:
moving the arm to lift the tank from the structure; and
moving the arm about the plurality of axes to move the tank to the desired position.

16. The method of claim 14, wherein each of the number of tanks is selected from one of a fuel tank and a propane gas tank.

17. The method of claim 14 further comprising:
lifting the tank into the desired position using the arm with the interface connected to the tank; and
removing the tank from the arm when the tank is in the desired position.

18. The method of claim 14 further comprising: disengaging the tank from the tank securing structure on the structure before moving the arm such that the tank is moved into the desired position.

19. The method of claim 14 further comprising: rotating the tank with respect to the arm with the interface connected to the tank.

20. The method of claim 14, wherein the step of connecting the tank to the interface comprises: connecting the interface to a connector associated with the tank.

21. The method of claim 14, wherein the structure is a rotatable structure and further comprising: positioning the tank relative to the arm by rotating the rotatable structure to a selected position; and locking the rotatable structure in the selected position.

22. A method of handling a tank comprising:

securing the tank, using a tank securing structure, on a structure on a platform, the tank securing structure configured to hold a number of tanks on the structure, such that the tank securing structure comprises: a plurality of rings, such that each ring in the plurality of rings is configured to hold a tank, a rod attached by an extension to each ring in the plurality of rings, and a rod support on a ring support structure;

supporting the rod, using the rod support, such that the rod support is configured to allow vertical movement of the rod;

supporting the plurality of rings, using the ring support structure;

positioning an arm relative to the tank held by a rotatable structure on the platform in which the rotatable structure is configured to hold the number of tanks, in which each of the number of tanks is selected from one of: a fuel tank and a propane gas tank, and in which the arm is associated with the platform and configured to move about a plurality of axes and has an interface configured to connect to the tank;

positioning the tank relative to the arm by rotating the rotatable structure to a selected position;

locking the rotatable structure in the selected position;

connecting the interface to a connector associated with the tank;

disengaging the tank from the tank securing structure on the rotatable structure, in which the tank securing structure is configured to secure the number of tanks to the rotatable structure when the tank securing structure engages the number of tanks;

moving the arm such that the tank is moved into a desired position by moving the arm to lift the tank from the rotatable structure and moving the arm about the plurality of axes to move the tank to the desired position; and rotating the tank with respect to the arm with the interface connected to the tank; and removing the tank from the arm when the tank is in the desired position.

* * * * *